US012484789B2

(12) United States Patent
Vallius et al.

(10) Patent No.: US 12,484,789 B2
(45) Date of Patent: Dec. 2, 2025

(54) TECHNIQUES FOR TEMPERATURE MEASUREMENT ACCORDING TO A CALIBRATED TEMPERATURE

(71) Applicant: Oura Health Oy, Oulu (FI)

(72) Inventors: Tero Juhani Vallius, Kontio (FI); Jussi Petteri Järvelä, Kempele (FI); Ville Olavi Tiensuu, Oulu (FI); Sami Seppo Pelkonen, Oulu (FI)

(73) Assignee: Oura Health Oy, Oulu (FI)

( * ) Notice: Subject to any disclaimer, the term of this patent is extended or adjusted under 35 U.S.C. 154(b) by 178 days.

(21) Appl. No.: 17/949,805

(22) Filed: Sep. 21, 2022

(65) Prior Publication Data

US 2023/0096307 A1 Mar. 30, 2023

Related U.S. Application Data

(60) Provisional application No. 63/250,019, filed on Sep. 29, 2021.

(51) Int. Cl.
*A61B 5/01* (2006.01)
*A61B 5/00* (2006.01)

(52) U.S. Cl.
CPC ............ *A61B 5/01* (2013.01); *A61B 5/6826* (2013.01); *A61B 2560/0228* (2013.01); *A61B 2560/0238* (2013.01); *A61B 2562/0219* (2013.01); *A61B 2562/0271* (2013.01)

(58) Field of Classification Search
CPC ..... A61B 5/6826; A61B 5/02438; A61B 5/01; A61B 2560/0228; A61B 2560/0238; A61B 2562/0219; A61B 2562/0271; A61B 2560/0223
See application file for complete search history.

(56) References Cited

U.S. PATENT DOCUMENTS

| | | | |
|---|---|---|---|
| 5,813,766 A * | 9/1998 | Chen | A61B 5/6826 340/407.1 |
| 9,953,507 B1 * | 4/2018 | Smith | G08B 21/043 |
| 2013/0116958 A1 * | 5/2013 | Kristensson | G01C 17/38 702/85 |
| 2017/0209053 A1 * | 7/2017 | Pantelopoulos | A61B 5/7264 |
| 2019/0110755 A1 * | 4/2019 | Capodilupo | A61B 5/02055 |
| 2019/0290208 A1 * | 9/2019 | Toth | A61B 5/316 |
| 2019/0380579 A1 * | 12/2019 | Kitagawa | A61B 5/0004 |
| 2019/0388031 A1 * | 12/2019 | Haber | G01K 7/427 |
| 2021/0199516 A1 * | 7/2021 | Yarden | G01K 15/005 |
| 2021/0401378 A1 * | 12/2021 | Pho | G16H 50/20 |

* cited by examiner

*Primary Examiner* — John D Li
(74) *Attorney, Agent, or Firm* — Holland & Hart LLP

(57) ABSTRACT

Methods, systems, and devices for temperature calibration are described. A device may support temperature calibration for a set of temperature sensors. For example, a wearable device may activate a set of temperature sensors associated with the wearable device. The set of temperature sensors may include a primary temperature sensor and one or more secondary temperature sensors. The wearable device may determine a trigger to calibrate the one or more secondary temperature sensors based on one or more conditions, and calibrate the one or more secondary temperature sensors using the primary temperature sensor based on the trigger. Based on the calibrating, the wearable device may process temperature data associated with a user that is received from one or more of the primary temperature sensor or the one or more secondary temperature sensors.

19 Claims, 15 Drawing Sheets

TECHNIQUES FOR TEMPERATURE MEASUREMENT ACCORDING TO A CALIBRATED TEMPERATURE

CROSS REFERENCE

The present Application for Patent claims the benefit of U.S. Provisional Patent Application No. 63/250,019 by TERO VALLIUS, entitled "TECHNIQUES FOR TEMPERATURE MEASUREMENT ACCORDING TO A CALIBRATED TEMPERATURE," filed Sep. 29, 2021, assigned to the assignee hereof, and expressly incorporated by reference herein.

FIELD OF TECHNOLOGY

The following relates to wearable devices and data processing, including techniques for temperature measurement according to a calibrated temperature.

BACKGROUND

Some wearable devices may be configured to collect physiological data from users, including temperature data and the like. However, uncalibrated temperature sensors of some wearable devices may lead to inaccurate temperature readings and inaccurate insights that are derived from temperature measurements.

DETAILED DESCRIPTION

Figure 1:
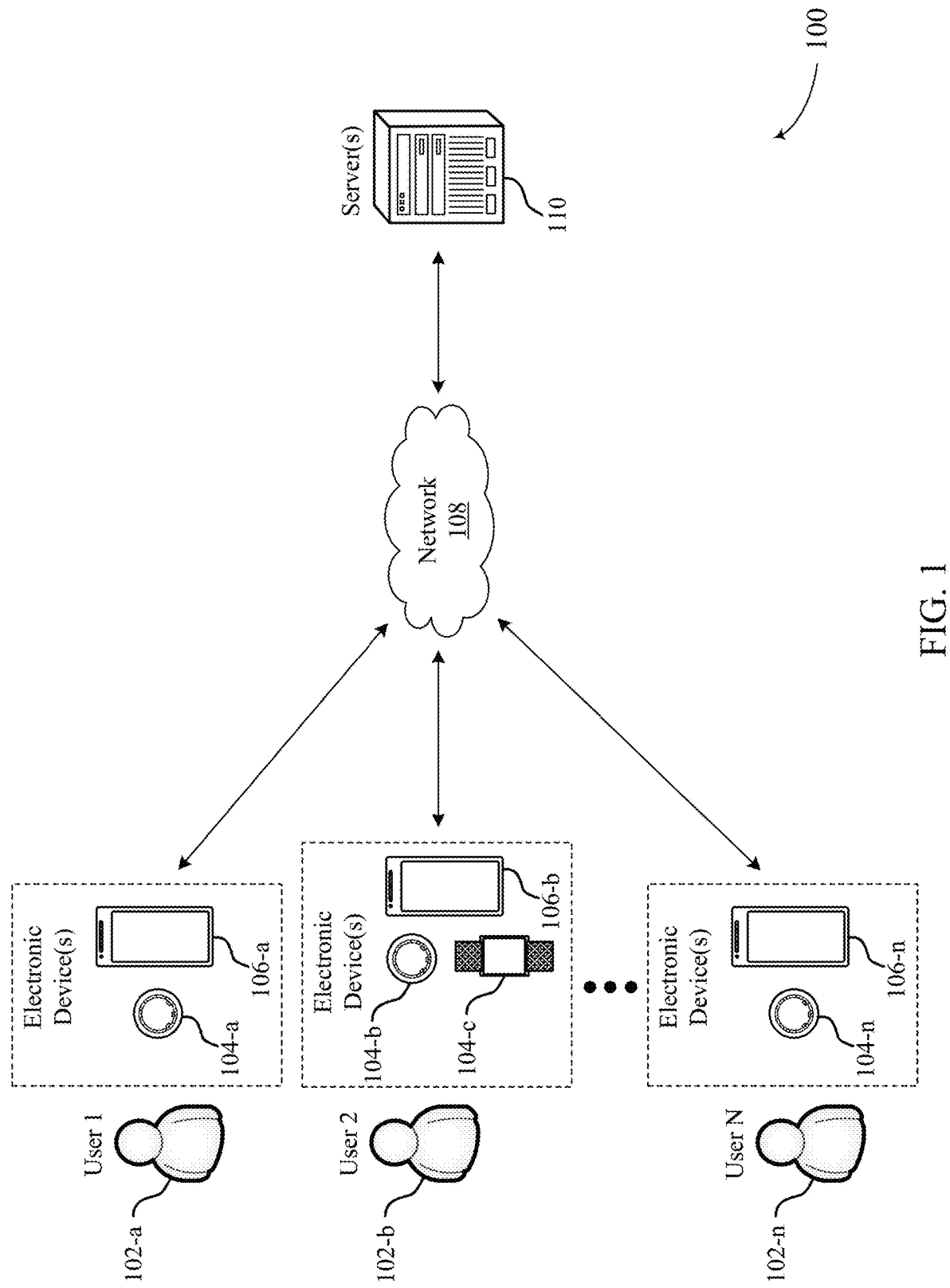
FIGS. 1 and 2 illustrate examples of systems that support techniques for temperature measurement according to a calibrated temperature in accordance with aspects of the present disclosure.

Various aspects of the present disclosure relate to a wearable device that may include a wearable device (for example, a wearable ring device also referred to as a "ring computing device" or a "ring") supporting temperature sensor calibration and temperature measurement according to a calibrated temperature sensor. The wearable device may be configured with a temperature determination system that may determine a user's temperature. The temperature determination system may include a set of temperature sensors that may include a calibrated temperature sensor and one or more uncalibrated temperature sensors. The calibrated temperature sensor may output calibrated temperature data that accurately indicates the user's temperature associated with a region of the calibrated temperature sensor.

The wearable device may perform calibration operations using the calibrated temperature sensor in order to improve the temperature readings of the uncalibrated temperature sensors. In some cases, after fabrication, the wearable device may include initial temperature determination data (e.g., lookup tables) that may be used by the wearable device to determine user temperature from uncalibrated temperature sensor data. In some cases, in response to calibration conditions at a factory, or after a user purchase, the wearable device may perform calibration operations that update the temperature determination data. The updated temperature determination data may provide more accurate user temperature readings for the uncalibrated temperature sensors relative to the user temperature readings using the initial temperature determination data.

The wearable device may perform temperature calibration operations in a variety of scenarios. In some implementations, the wearable device may perform calibration operations after manufacturing (e.g., at the factory), but before purchase by the user. Additionally, or alternatively, the wearable device may perform calibration operations after user acquisition. In some other implementations, the wearable device may perform calibration operations in response to the satisfaction of one or more conditions (also referred to as calibration conditions). Example conditions may include conditions that indicate the wearable device is at a stable temperature for a period of time. Additional example conditions may include, but are not limited to: a stable temperature for a period of time, a lack of motion for a period of time, a wearable device charging condition, a time of day/night, an elapsed time since a last calibration, a factory calibration condition, a user-generated calibration command, or a new stable temperature previously unused for calibration.

The calibration operations described herein may ensure that a plurality of uncalibrated temperature sensors associated with the wearable device may provide accurate user temperature measurements for a variety of wearable device orientations (e.g., ring rotational orientations). The calibration operations using the calibrated temperature sensor may also save time and reduce cost during factory calibration. Additionally, the calibration operations during user ownership may help ensure that accurate temperature data is acquired over time, even if operating characteristics of the uncalibrated temperature sensors change over time.

Aspects of the disclosure are initially described in the context of systems supporting physiological data collection from users via wearable devices. Aspects of the disclosure are further illustrated by and described with reference to apparatus diagrams, system diagrams, and flowcharts that relate to techniques for temperature measurement according to a calibrated temperature.

FIG. 1 illustrates an example of a system 100 that supports techniques for temperature measurement according to a calibrated temperature in accordance with aspects of the present disclosure. The system 100 includes a plurality of electronic devices (e.g., wearable devices 104, user devices 106) that may be worn and/or operated by one or more users 102. The system 100 further includes a network 108 and one or more servers 110.

The electronic devices may include any electronic devices known in the art, including wearable devices 104 (e.g., ring wearable devices, watch wearable devices, etc.), user devices 106 (e.g., smartphones, laptops, tablets). The electronic devices associated with the respective users 102 may include one or more of the following functionalities: 1) measuring physiological data, 2) storing the measured data, 3) processing the data, 4) providing outputs (e.g., via GUIs) to a user 102 based on the processed data, and 5) communicating data with one another and/or other computing devices. Different electronic devices may perform one or more of the functionalities.

Example wearable devices 104 may include wearable computing devices, such as a ring computing device (hereinafter "ring") configured to be worn on a user's 102 finger, a wrist computing device (e.g., a smart watch, fitness band, or bracelet) configured to be worn on a user's 102 wrist, and/or a head mounted computing device (e.g., glasses/goggles). Wearable devices 104 may also include bands, straps (e.g., flexible or inflexible bands or straps), stick-on sensors, and the like, that may be positioned in other locations, such as bands around the head (e.g., a forehead headband), arm (e.g., a forearm band and/or bicep band), and/or leg (e.g., a thigh or calf band), behind the ear, under the armpit, and the like. Wearable devices 104 may also be attached to, or included in, articles of clothing. For example, wearable devices 104 may be included in pockets and/or pouches on clothing. As another example, wearable device 104 may be clipped and/or pinned to clothing, or may otherwise be maintained within the vicinity of the user 102. Example articles of clothing may include, but are not limited to, hats, shirts, gloves, pants, socks, outerwear (e.g., jackets), and undergarments. In some implementations, wearable devices 104 may be included with other types of devices such as training/sporting devices that are used during physical activity. For example, wearable devices 104 may be attached to, or included in, a bicycle, skis, a tennis racket, a golf club, and/or training weights.

Much of the present disclosure may be described in the context of a ring wearable device 104. Accordingly, the terms "ring 104," "wearable device 104," and like terms, may be used interchangeably, unless noted otherwise herein. However, the use of the term "ring 104" is not to be regarded as limiting, as it is contemplated herein that aspects of the present disclosure may be performed using other wearable devices (e.g., watch wearable devices, necklace wearable device, bracelet wearable devices, earring wearable devices, anklet wearable devices, and the like).

In some aspects, user devices 106 may include handheld mobile computing devices, such as smartphones and tablet computing devices. User devices 106 may also include personal computers, such as laptop and desktop computing devices. Other example user devices 106 may include server computing devices that may communicate with other electronic devices (e.g., via the Internet). In some implementations, computing devices may include medical devices, such as external wearable computing devices (e.g., Holter monitors). Medical devices may also include implantable medical devices, such as pacemakers and cardioverter defibrillators. Other example user devices 106 may include home computing devices, such as internet of things (IoT) devices (e.g., IoT devices), smart televisions, smart speakers, smart displays (e.g., video call displays), hubs (e.g., wireless communication hubs), security systems, smart appliances (e.g., thermostats and refrigerators), and fitness equipment.

Some electronic devices (e.g., wearable devices 104, user devices 106) may measure physiological parameters of respective users 102, such as photoplethysmography waveforms, continuous skin temperature, a pulse waveform, respiration rate, heart rate, heart rate variability (HRV), actigraphy, galvanic skin response, pulse oximetry, and/or other physiological parameters. Some electronic devices that measure physiological parameters may also perform some/all of the calculations described herein. Some electronic devices may not measure physiological parameters, but may perform some/all of the calculations described herein. For example, a ring (e.g., wearable device 104), mobile device application, or a server computing device may process received physiological data that was measured by other devices.

In some implementations, a user 102 may operate, or may be associated with, multiple electronic devices, that may measure physiological parameters and that may process the measured physiological parameters. In some implementations, a user 102 may have a ring (e.g., wearable device 104) that measures physiological parameters. The user 102 may also have, or be associated with, a user device 106 (e.g., mobile device, smartphone), where the wearable device 104 and the user device 106 are communicatively coupled to one another. In some cases, the user device 106 may receive data from the wearable device 104 and perform some/all of the calculations described herein. In some implementations, the user device 106 may also measure physiological parameters described herein, such as motion/activity parameters.

For example, as illustrated in FIG. 1, a first user 102-*a* (User 1) may operate, or may be associated with, a wearable device 104-*a* (e.g., ring 104-*a*) and a user device 106-*a* that may operate as described herein. In this example, the user device 106-*a* associated with user 102-*a* may process/store physiological parameters measured by the ring 104-*a*. Comparatively, a second user 102-*b* (User 2) may be associated with a ring 104-*b*, a watch wearable device 104-*c* (e.g., watch 104-*c*), and a user device 106-*b*, where the user device 106-*b* associated with user 102-*b* may process/store physiological parameters measured by the ring 104-*b* and/or the watch 104-*c*. Moreover, an nth user 102-*n* (User N) may be associated with an arrangement of electronic devices described herein (e.g., ring 104-*n*, user device 106-*n*). In some aspects, wearable devices 104 (e.g., rings 104, watches 104) and other electronic devices may be communicatively coupled to the user devices 106 of the respective users 102 via Bluetooth, Wi-Fi, and other wireless protocols.

In some implementations, the rings 104 (e.g., wearable devices 104) of the system 100 may be configured to collect physiological data from the respective users 102 based on arterial blood flow within the user's finger. In particular, a ring 104 may utilize one or more LEDs (e.g., red LEDs, green LEDs) that emit light on the palm-side of a user's finger to collect physiological data based on arterial blood flow within the user's finger. In some implementations, the ring 104 may acquire the physiological data using a combination of both green and red LEDs. The physiological data may include any physiological data known in the art including, but not limited to, temperature data, accelerometer data (e.g., movement/motion data), heart rate data, HRV data, blood oxygen level data, or any combination thereof.

The use of both green and red LEDs may provide several advantages over other solutions, as red and green LEDs have been found to have their own distinct advantages when acquiring physiological data under different conditions (e.g., light/dark, active/inactive) and via different parts of the body, and the like. For example, green LEDs have been found to exhibit better performance during exercise. Moreover, using multiple LEDs (e.g., green and red LEDs) distributed around the ring 104 has been found to exhibit superior performance as compared to wearable devices that utilize LEDs that are positioned close to one another, such as within a watch wearable device. Furthermore, the blood vessels in the finger (e.g., arteries, capillaries) are more accessible via LEDs as compared to blood vessels in the wrist. In particular, arteries in the wrist are positioned on the bottom of the wrist (e.g., palm-side of the wrist), meaning only capillaries are accessible on the top of the wrist (e.g., back of hand side of the wrist), where wearable watch devices and similar devices are typically worn. As such, utilizing LEDs and other sensors within a ring 104 has been found to exhibit superior performance as compared to wearable devices worn on the wrist, as the ring 104 may have greater access to arteries (as compared to capillaries), thereby resulting in stronger signals and more valuable physiological data.

The electronic devices of the system 100 (e.g., user devices 106, wearable devices 104) may be communicatively coupled to one or more servers 110 via wired or wireless communication protocols. For example, as shown in FIG. 1, the electronic devices (e.g., user devices 106) may be communicatively coupled to one or more servers 110 via a network 108. The network 108 may implement transfer control protocol and internet protocol (TCP/IP), such as the Internet, or may implement other network protocols. Network connections between the network 108 and the respective electronic devices may facilitate transport of data via email, web, text messages, mail, or any other appropriate form of interaction within a computer network. For example, in some implementations, the ring 104-a associated with the first user 102-a may be communicatively coupled to the user device 106-a, where the user device 106-a is communicatively coupled to the one or more servers 110 via the network 108. In additional or alternative cases, wearable devices 104 (e.g., rings 104, watches 104) may be directly communicatively coupled to the network 108.

The system 100 may offer an on-demand database service between the user devices 106 and the one or more servers 110. In some cases, the one or more servers 110 may receive data from the user devices 106 via the network 108, and may store and analyze the data. Similarly, the one or more servers 110 may provide data to the user devices 106 via the network 108. In some cases, the one or more servers 110 may be located at one or more data centers. The one or more servers 110 may be used for data storage, management, and processing. In some implementations, the one or more servers 110 may provide a web-based interface to the user device 106 via web browsers.

In some aspects, the system 100 may detect periods of time when a user 102 is asleep, and classify periods of time when the user 102 is asleep into one or more sleep stages (e.g., sleep stage classification). For example, as shown in FIG. 1, User 102-a may be associated with a wearable device 104-a (e.g., ring 104-a) and a user device 106-a. In this example, the ring 104-a may collect physiological data associated with the user 102-a, including temperature, heart rate, HRV, respiratory rate, and the like. In some aspects, data collected by the ring 104-a may be input to a machine learning classifier, where the machine learning classifier is configured to determine periods of time when the user 102-a is (or was) asleep. Moreover, the machine learning classifier may be configured to classify periods of time into different sleep stages, including an awake sleep stage, a rapid eye movement (REM) sleep stage, a light sleep stage (non-REM (NREM)), and a deep sleep stage (NREM). In some aspects, the classified sleep stages may be displayed to the user 102-a via a graphical user interface (GUI) of the user device 106-a. Sleep stage classification may be used to provide feedback to a user 102-a regarding the user's sleeping patterns, such as recommended bedtimes, recommended wake-up times, and the like. Moreover, in some implementations, sleep stage classification techniques described herein may be used to calculate scores for the respective user, such as Sleep Scores, Readiness Scores, and the like.

In some aspects, the system 100 may utilize circadian rhythm-derived features to further improve physiological data collection, data processing procedures, and other techniques described herein. The term circadian rhythm may refer to a natural, internal process that regulates an individual's sleep-wake cycle that repeats approximately every 24 hours. In this regard, techniques described herein may utilize circadian rhythm adjustment models to improve physiological data collection, analysis, and data processing. For example, a circadian rhythm adjustment model may be input into a machine learning classifier along with physiological data collected from the user 102-a via the wearable device 104-a. In this example, the circadian rhythm adjustment model may be configured to "weight," or adjust, physiological data collected throughout a user's natural, approximately 24-hour circadian rhythm. In some implementations, the system may initially start with a "baseline" circadian rhythm adjustment model, and may modify the baseline model using physiological data collected from each user 102 to generate tailored, individualized circadian rhythm adjustment models that are specific to each respective user 102.

In some aspects, the system 100 may utilize other biological rhythms to further improve physiological data collection, analysis, and processing by phase of these other rhythms. For example, if a weekly rhythm is detected within an individual's baseline data, then the model may be configured to adjust "weights" of data by day of the week. Biological rhythms that may require adjustment to the model by this method include: 1) ultradian (faster than a day rhythms, including sleep cycles in a sleep state, and oscillations from less than an hour to several hours periodicity in the measured physiological variables during wake state; 2) circadian rhythms; 3) non-endogenous daily rhythms shown to be imposed on top of circadian rhythms, as in work schedules; 4) weekly rhythms, or other artificial time periodicities exogenously imposed (e.g. in a hypothetical culture with 12 day "weeks", 12 day rhythms could be used); 5) multi-day ovarian rhythms in women and spermatogenesis rhythms in men; 6) lunar rhythms (relevant for individuals living with low or no artificial lights); and 7) seasonal rhythms.

The biological rhythms are not always stationary rhythms. For example, many women experience variability in ovarian cycle length across cycles, and ultradian rhythms are not expected to occur at exactly the same time or periodicity across days even within a user. As such, signal processing techniques sufficient to quantify the frequency composition while preserving temporal resolution of these rhythms in physiological data may be used to improve detection of these rhythms, to assign phase of each rhythm to each moment in time measured, and to thereby modify adjustment models and comparisons of time intervals. The biological rhythm-adjustment models and parameters can be added in linear or non-linear combinations as appropriate to more accurately capture the dynamic physiological baselines of an individual or group of individuals.

In some aspects, the respective devices of the system 100 may support techniques for temperature measurement according to a calibrated temperature. In particular, the system 100 illustrated in FIG. 1 may support techniques for temperature calibration at a wearable device 104 (e.g., a ring 104). For example, a wearable device 104 (e.g., a ring 104) may activate a set of temperature sensors associated with the wearable device 104. The set of temperature sensors may include a primary temperature sensor and one or more secondary temperature sensors. The wearable device 104 (e.g., a ring 104) may determine a trigger to calibrate the one or more secondary temperature sensors based at least in part on one or more conditions. As such, the wearable device 104 (e.g., a ring 104) may calibrate the one or more secondary temperature sensors using the primary temperature sensor based at least in part on the trigger. The wearable device 104 (e.g., a ring 104) may process temperature data associated with a User 102 that is received from one or more of the primary temperature sensor or the one or more secondary temperature sensors based at least in part on the calibrating. The processing of the temperature data may be performed by any of the components of the system 100, including the wearable device 104, the user device 106 associated with User 102, the one or more servers 110, or any combination thereof.

In some implementations, any of the components of the system 100, including the wearable device 104, the user device 106 associated with User 102, the one or more servers 110, or any combination thereof, may monitor the temperature data associated with the User 102 from one or more of the primary temperature sensor or the one or more secondary temperature sensors for a duration, and determine that the temperature data associated with the User 102 from one or more of the primary temperature sensor or the one or more secondary temperature sensors satisfies a threshold for the duration. The calibration of the one or more secondary temperature sensors using the primary temperature sensor may be performed by any of the components of the system 100, including the wearable device 104, the user device 106 associated with User 102, the one or more servers 110, or any combination thereof, may be based at least in part on determining that the temperature data associated with the user from one or more of the primary temperature sensor or the one or more secondary temperature sensors satisfies the threshold for the duration.

In some implementations, any of the components of the system 100, including the wearable device 104, the user device 106 associated with User 102, the one or more servers 110, or any combination thereof, may monitor accelerometer data from one or more accelerometer sensors associated with the wearable device 104 for a duration, and determine that accelerometer data from the one or more accelerometer sensors satisfies a threshold for the duration. Any of the components of the system 100, including the wearable device 104, the user device 106 associated with User 102, the one or more servers 110, or any combination thereof, may determine an absence of motion associated with the User 102 based at least in part on determining that the accelerometer data from the one or more accelerometer sensors satisfies the threshold for the duration, the accelerometer data indicating whether the wearable device 104 is worn by the User 102. The calibration of the one or more secondary temperature sensors using the primary temperature sensor may be performed by any of the components of the system 100, including the wearable device 104, the user device 106 associated with User 102, the one or more servers 110, or any combination thereof, may be based at least in part on determining the absence of motion associated with the user.

In other implementations, any of the components of the system 100, including the wearable device 104, the user device 106 associated with User 102, the one or more servers 110, or any combination thereof, may monitor a power level associated with the wearable device 104, and determine that the power level associated with the wearable device 104 satisfies a threshold. The calibration of the one or more secondary temperature sensors using the primary temperature sensor may be performed by any of the components of the system 100, including the wearable device 104, the user device 106 associated with User 102, the one or more servers 110, or any combination thereof, may be based at least in part on the power level associated with the wearable device satisfying the threshold.

In some other implementations, any of the components of the system 100, including the wearable device 104, the user device 106 associated with User 102, the one or more servers 110, or any combination thereof, may establish a connection between the wearable device 104 and a power charger associated with the wearable device 104. The calibration of the one or more secondary temperature sensors using the primary temperature sensor may be performed by any of the components of the system 100, including the wearable device 104, the user device 106 associated with User 102, the one or more servers 110, or any combination thereof, and may be based at least in part on establishing the connection between the wearable device 104 and the power charger associated with the wearable device 104.

In some implementations, any of the components of the system 100, including the wearable device 104, the user device 106 associated with User 102, the one or more servers 110, or any combination thereof, may determine a timestamp associated with a previous calibration of the one or more secondary temperature sensors, and determine that an elapsed duration from the timestamp associated with the previous calibration satisfies a threshold. The calibration of the one or more secondary temperature sensors using the primary temperature sensor may be performed by any of the components of the system 100, including the wearable device 104, the user device 106 associated with User 102, the one or more servers 110, or any combination thereof, may be based at least in part on the elapsed duration from the timestamp associated with the previous calibration satisfying the threshold.

In some implementations, any of the components of the system 100, including the wearable device 104, the user device 106 associated with User 102, the one or more servers 110, or any combination thereof, may receive a user command from one or more of the wearable device 104 or a remote device (e.g., the user device 106) in communication with the wearable device 104 to enable the temperature calibration. The calibration of the one or more secondary temperature sensors using the primary temperature sensor may be performed by any of the components of the system 100, including the wearable device 104, the user device 106 associated with User 102, the one or more servers 110, or any combination thereof. Moreover, the calibration may be based at least in part on the user command from one or more of the wearable device 104 or the remote device (e.g., the user device 106) in communication with the wearable device 104.

In some implementations, any of the components of the system 100, including the wearable device 104, the user device 106 associated with User 102, the one or more servers 110, or any combination thereof, may determine a booting operation associated with the wearable device 104. The calibration of the one or more secondary temperature sensors using the primary temperature sensor may be performed by any of the components of the system 100, including the wearable device 104, the user device 106 associated with User 102, the one or more servers 110, or any combination thereof, and may be based at least in part on the booting operation associated with the wearable device 104.

In some implementations, any of the components of the system 100, including the wearable device 104, the user device 106 associated with User 102, the one or more servers 110, or any combination thereof, may adjust a respective parameter associated with each secondary temperature sensor of the one or more secondary temperature sensors based at least in part on a respective parameter associated with the primary temperature sensor and one or more of sampled temperature data from each secondary temperature sensor of the one or more secondary temperature sensors. The respective parameter associated with each secondary temperature sensor of the one or more secondary temperature sensors includes one or more of a temperature measurement range, an accuracy temperature measurement range, or a temperature measurement sampling interval.

In some implementations, any of the components of the system 100, including the wearable device 104, the user device 106 associated with User 102, the one or more servers 110, or any combination thereof, may map sampled temperature data from each secondary temperature sensor of the one or more secondary temperature sensors to a temperature-resistance model, and adjust a respective parameter associated with each secondary temperature sensor of the one or more secondary temperature sensors based at least in part on a respective parameter associated with the primary temperature sensor and mapping the sampled temperature data from each secondary temperature sensor of the one or more secondary temperature sensors to the temperature-resistance model.

In some implementations, any of the components of the system 100, including the wearable device 104, the user device 106 associated with User 102, the one or more servers 110, or any combination thereof, may determine to calibrate the one or more secondary temperature sensors separately or jointly based at least in part on a manufacturing configuration of the wearable device 104 or a user enabled configuration of the wearable device 104. The calibration of the one or more secondary temperature sensors using the primary temperature sensor may be performed by any of the components of the system 100, including the wearable device 104, the user device 106 associated with User 102, the one or more servers 110, or any combination thereof, may be based at least in part on determining to calibrate the one or more secondary temperature sensors separately or jointly.

In some implementations, any of the components of the system 100, including the wearable device 104, the user device 106 associated with User 102, the one or more servers 110, or any combination thereof, may transmit the temperature data associated with the user from the wearable device 104 to a remote device (e.g., the user device 106) in communication with the wearable device 104 to output a representation of the temperature data via a graphical user interface of the remote device (e.g., the user device 106).

It should be appreciated by a person skilled in the art that one or more aspects of the disclosure may be implemented in a system 100 to additionally, or alternatively solve other problems than those described above. Furthermore, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims.

Figure 2:
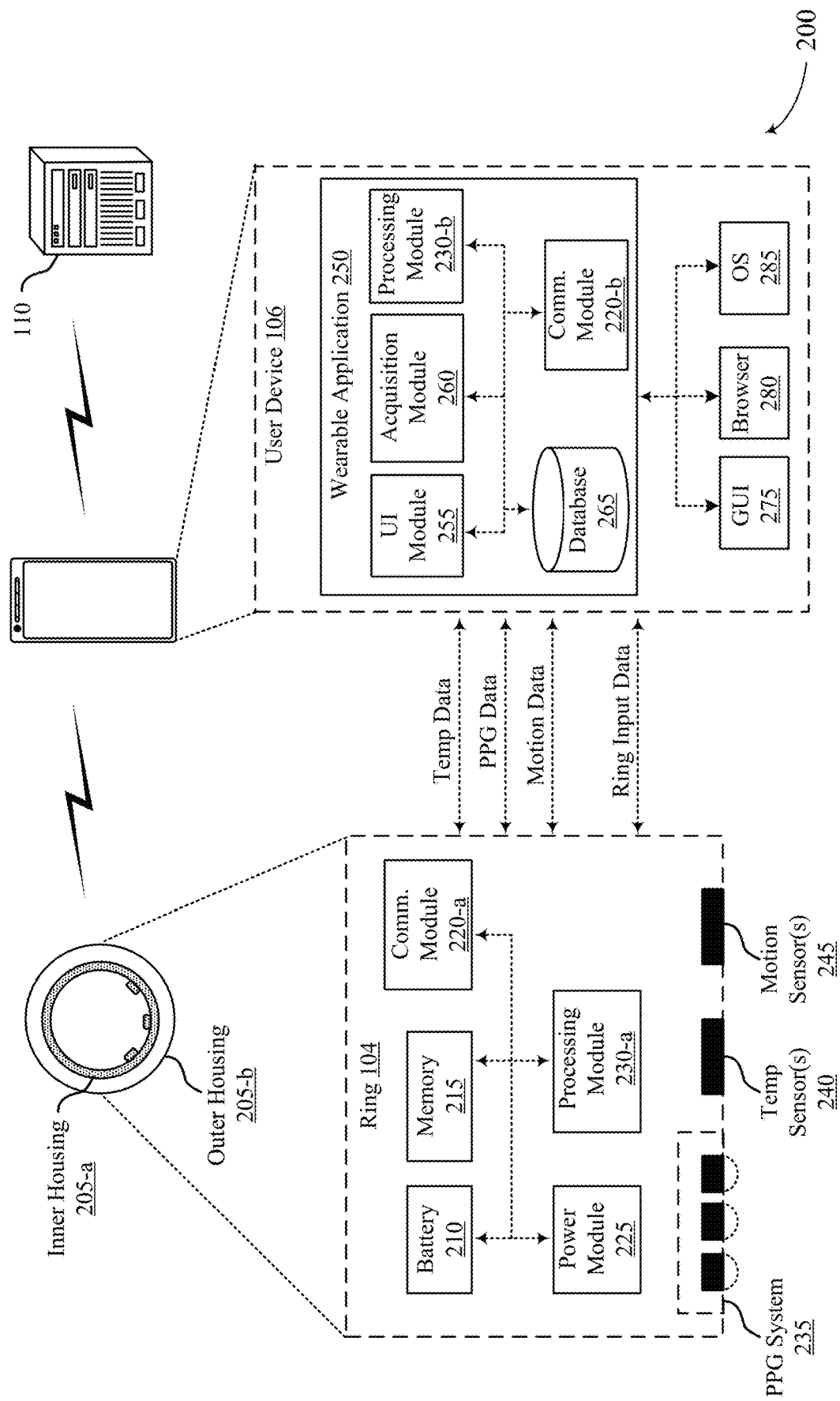

FIG. 2 illustrates an example of a system 200 that supports techniques for temperature measurement according to a calibrated temperature in accordance with aspects of the present disclosure. The system 200 may implement, or be implemented by, system 100. In particular, system 200 illustrates an example of a ring 104 (e.g., wearable device 104), a user device 106, and a server 110, as described with reference to FIG. 1.

In some aspects, the ring 104 may be configured to be worn around a user's finger, and may determine one or more user physiological parameters when worn around the user's finger. Example measurements and determinations may include, but are not limited to, user skin temperature, pulse waveforms, respiratory rate, heart rate, HRV, blood oxygen levels, and the like.

System 200 further includes a user device 106 (e.g., a smartphone) in communication with the ring 104. For example, the ring 104 may be in wireless and/or wired communication with the user device 106. In some implementations, the ring 104 may send measured and processed data (e.g., temperature data, photoplethysmogram (PPG) data, motion/accelerometer data, ring input data, and the like) to the user device 106. The user device 106 may also send data to the ring 104, such as ring 104 firmware/configuration updates. The user device 106 may process data. In some implementations, the user device 106 may transmit data to the server 110 for processing and/or storage.

The ring 104 may include a housing 205 that may include an inner housing 205-*a* and an outer housing 205-*b*. In some aspects, the housing 205 of the ring 104 may store or otherwise include various components of the ring including, but not limited to, device electronics, a power source (e.g., battery 210, and/or capacitor), one or more substrates (e.g., printable circuit boards) that interconnect the device electronics and/or power source, and the like. The device electronics may include device modules (e.g., hardware/software), such as: a processing module 230-*a*, a memory 215, a communication module 220-*a*, a power module 225, and the like. The device electronics may also include one or more sensors. Example sensors may include one or more temperature sensors 240, a PPG sensor assembly (e.g., a PPG system 235), and one or more motion sensors 245.

The sensors may include associated modules (not illustrated) configured to communicate with the respective components/modules of the ring 104, and generate signals associated with the respective sensors. In some aspects, each of the components/modules of the ring 104 may be communicatively coupled to one another via wired or wireless connections. Moreover, the ring 104 may include additional and/or alternative sensors or other components that are configured to collect physiological data from the user, including light sensors (e.g., LEDs), oximeters, and the like.

The ring 104 shown and described with reference to FIG. 2 is provided solely for illustrative purposes. As such, the ring 104 may include additional or alternative components as those illustrated in FIG. 2. Other rings 104 that provide functionality described herein may be fabricated. For example, rings 104 with fewer components (e.g., sensors) may be fabricated. In a specific example, a ring 104 with a single temperature sensor 240 (or other sensor), a power source, and device electronics configured to read the single temperature sensor 240 (or other sensor) may be fabricated. In another specific example, a temperature sensor 240 (or other sensor) may be attached to a user's finger (e.g., using a clamps, spring loaded clamps, etc.). In this case, the sensor may be wired to another computing device, such as a wrist worn computing device that reads the temperature sensor 240 (or other sensor). In other examples, a ring 104 that includes additional sensors and processing functionality may be fabricated.

The housing 205 may include one or more housing 205 components. The housing 205 may include an outer housing 205-b component (e.g., a shell) and an inner housing 205-a component (e.g., a molding). The housing 205 may include additional components (e.g., additional layers) not explicitly illustrated in FIG. 2. For example, in some implementations, the ring 104 may include one or more insulating layers that electrically insulate the device electronics and other conductive materials (e.g., electrical traces) from the outer housing 205-b (e.g., a metal outer housing 205-b). The housing 205 may provide structural support for the device electronics, battery 210, substrate(s), and other components. For example, the housing 205 may protect the device electronics, battery 210, and substrate(s) from mechanical forces, such as pressure and impacts. The housing 205 may also protect the device electronics, battery 210, and substrate(s) from water and/or other chemicals.

The outer housing 205-b may be fabricated from one or more materials. In some implementations, the outer housing 205-b may include a metal, such as titanium, that may provide strength and abrasion resistance at a relatively light weight. The outer housing 205-b may also be fabricated from other materials, such polymers. In some implementations, the outer housing 205-b may be protective as well as decorative.

The inner housing 205-a may be configured to interface with the user's finger. The inner housing 205-a may be formed from a polymer (e.g., a medical grade polymer) or other material. In some implementations, the inner housing 205-a may be transparent. For example, the inner housing 205-a may be transparent to light emitted by the PPG light emitting diodes (LEDs). In some implementations, the inner housing 205-a component may be molded onto the outer housing 205-b. For example, the inner housing 205-a may include a polymer that is molded (e.g., injection molded) to fit into an outer housing 205-b metallic shell.

The ring 104 may include one or more substrates (not illustrated). The device electronics and battery 210 may be included on the one or more substrates. For example, the device electronics and battery 210 may be mounted on one or more substrates. Example substrates may include one or more printed circuit boards (PCBs), such as flexible printed circuit board (PCB) (e.g., polyimide). In some implementations, the electronics/battery 210 may include surface mounted devices (e.g., surface-mount technology (SMT) devices) on a flexible PCB. In some implementations, the one or more substrates (e.g., one or more flexible PCBs) may include electrical traces that provide electrical communication between device electronics. The electrical traces may also connect the battery 210 to the device electronics.

The device electronics, battery 210, and substrates may be arranged in the ring 104 in a variety of ways. In some implementations, one substrate that includes device electronics may be mounted along the bottom of the ring 104 (e.g., the bottom half), such that the sensors (e.g., the PPG system 235, the temperature sensors 240, motion sensors 245, and other sensors) interface with the underside of the user's finger. In these implementations, the battery 210 may be included along the top portion of the ring 104 (e.g., on another substrate).

The various components/modules of the ring 104 represent functionality (e.g., circuits and other components) that may be included in the ring 104. Modules may include any discrete and/or integrated electronic circuit components that implement analog and/or digital circuits capable of producing the functions attributed to the modules herein. For example, the modules may include analog circuits (e.g., amplification circuits, filtering circuits, analog/digital conversion circuits, and/or other signal conditioning circuits). The modules may also include digital circuits (e.g., combinational or sequential logic circuits, memory circuits etc.).

The memory 215 (memory module) of the ring 104 may include any volatile, non-volatile, magnetic, or electrical media, such as a random access memory (RAM), read-only memory (ROM), non-volatile RAM (NVRAM), electrically-erasable programmable ROM (EEPROM), flash memory, or any other memory device. The memory 215 may store any of the data described herein. For example, the memory 215 may be configured to store data (e.g., motion data, temperature data, PPG data) collected by the respective sensors and the PPG system 235. Furthermore, memory 215 may include instructions that, when executed by one or more processing circuits, cause the modules to perform various functions attributed to the modules herein. The device electronics of the ring 104 described herein are only example device electronics. As such, the types of electronic components used to implement the device electronics may vary based on design considerations.

The functions attributed to the modules of the ring 104 described herein may be embodied as one or more processors, hardware, firmware, software, or any combination thereof. Depiction of different features as modules is intended to highlight different functional aspects and does not necessarily imply that such modules have to be realized by separate hardware/software components. Rather, functionality associated with one or more modules may be performed by separate hardware/software components or integrated within common hardware/software components.

The processing module 230-a of the ring 104 may include one or more processors (e.g., processing units), microcontrollers, digital signal processors, systems on a chip (SOCs), and/or other processing devices. The processing module 230-a communicates with the modules included in the ring 104. For example, the processing module 230-a may transmit/receive data to/from the modules and other components of the ring 104, such as the sensors. As described herein, the modules may be implemented by various circuit components. Accordingly, the modules may also be referred to as circuits (e.g., a communication circuit and power circuit).

The processing module 230-a may communicate with the memory 215. The memory 215 may include computer-readable instructions that, when executed by the processing module 230-a, cause the processing module 230-a to perform the various functions attributed to the processing module 230-a herein. In some implementations, the processing module 230-a (e.g., a microcontroller) may include additional features associated with other modules, such as communication functionality provided by the communication module 220-a (e.g., an integrated Bluetooth Low Energy transceiver) and/or additional onboard memory 215.

The communication module 220-a may include circuits that provide wireless and/or wired communication with the user device 106 (e.g., communication module 220-b of the user device 106). In some implementations, the communication modules 220-a, 220-b may include wireless communication circuits, such as Bluetooth circuits and/or Wi-Fi circuits. In some implementations, the communication modules 220-a, 220-b can include wired communication circuits, such as Universal Serial Bus (USB) communication circuits. Using the communication module 220-a, the ring 104 and the user device 106 may be configured to communicate with each other. The processing module 230-a of the ring may be configured to transmit/receive data to/from the user device 106 via the communication module 220-a. Example data may include, but is not limited to, motion data, temperature data, pulse waveforms, heart rate data, HRV data, PPG data, and status updates (e.g., charging status, battery charge level, and/or ring 104 configuration settings). The processing module 230-a of the ring may also be configured to receive updates (e.g., software/firmware updates) and data from the user device 106.

The ring 104 may include a battery 210 (e.g., a rechargeable battery 210). An example battery 210 may include a Lithium-Ion or Lithium-Polymer type battery 210, although a variety of battery 210 options are possible. The battery 210 may be wirelessly charged. In some implementations, the ring 104 may include a power source other than the battery 210, such as a capacitor. The power source (e.g., battery 210 or capacitor) may have a curved geometry that matches the curve of the ring 104. In some aspects, a charger or other power source may include additional sensors that may be used to collect data in addition to, or supplements, data collected by the ring 104 itself. Moreover, a charger or other power source for the ring 104 may function as a user device 106, and the charger or other power source for the ring 104 may be configured to receive data from the ring 104, store and/or process data received from the ring 104, and communicate data between the ring 104 and the servers 110.

In some aspects, the ring 104 includes a power module 225 that may control charging of the battery 210. For example, the power module 225 may interface with an external wireless charger that charges the battery 210 when interfaced with the ring 104. The charger may include a datum structure that mates with a ring 104 datum structure to create a specified orientation with the ring 104 during 104 charging. The power module 225 may also regulate voltage (s) of the device electronics, regulate power output to the device electronics, and monitor the state of charge of the battery 210. In some implementations, the battery 210 may include a protection circuit module (PCM) that protects the battery 210 from high current discharge, over voltage during 104 charging, and under voltage during 104 discharge. The power module 225 may also include electro-static discharge (ESD) protection.

The one or more temperature sensors 240 may be electrically coupled to the processing module 230-a. The temperature sensor 240 may be configured to generate a temperature signal (e.g., temperature data) that indicates a temperature read or sensed by the temperature sensor 240. The processing module 230-a may determine a temperature of the user in the location of the temperature sensor 240. For example, in the ring 104, temperature data generated by the temperature sensor 240 may indicate a temperature of a user at the user's finger (e.g., skin temperature). In some implementations, the temperature sensor 240 may contact the user's skin. In other implementations, a portion of the housing 205 (e.g., the inner housing 205-a) may form a barrier (e.g., a thin, thermally conductive barrier) between the temperature sensor 240 and the user's skin. In some implementations, portions of the ring 104 configured to contact the user's finger may have thermally conductive portions and thermally insulative portions. The thermally conductive portions may conduct heat from the user's finger to the temperature sensors 240. The thermally insulative portions may insulate portions of the ring 104 (e.g., the temperature sensor 240) from ambient temperature.

In some implementations, the temperature sensor 240 may generate a digital signal (e.g., temperature data) that the processing module 230-a may use to determine the temperature. As another example, in cases where the temperature sensor 240 includes a passive sensor, the processing module 230-a (or a temperature sensor 240 module) may measure a current/voltage generated by the temperature sensor 240 and determine the temperature based on the measured current/voltage. Example temperature sensors 240 may include a thermistor, such as a negative temperature coefficient (NTC) thermistor, or other types of sensors including resistors, transistors, diodes, and/or other electrical/electronic components.

The processing module 230-a may sample the user's temperature over time. For example, the processing module 230-a may sample the user's temperature according to a sampling rate. An example sampling rate may include one sample per second, although the processing module 230-a may be configured to sample the temperature signal at other sampling rates that are higher or lower than one sample per second. In some implementations, the processing module 230-a may sample the user's temperature continuously throughout the day and night. Sampling at a sufficient rate (e.g., one sample per second) throughout the day may provide sufficient temperature data for analysis described herein.

The processing module 230-a may store the sampled temperature data in memory 215. In some implementations, the processing module 230-a may process the sampled temperature data. For example, the processing module 230-a may determine average temperature values over a period of time. In one example, the processing module 230-a may determine an average temperature value each minute by summing all temperature values collected over the minute and dividing by the number of samples over the minute. In a specific example where the temperature is sampled at one sample per second, the average temperature may be a sum of all sampled temperatures for one minute divided by sixty seconds. The memory 215 may store the average temperature values over time. In some implementations, the memory 215 may store average temperatures (e.g., one per minute) instead of sampled temperatures in order to conserve memory 215.

The sampling rate may be stored in memory 215 and may be configurable. In some implementations, the sampling rate may be the same throughout the day and night. In other implementations, the sampling rate may be changed throughout the day/night. In some implementations, the ring 104 may filter/reject temperature readings, such as large spikes in temperature that are not indicative of physiological changes (e.g., a temperature spike from a hot shower). In some implementations, the ring 104 may filter/reject temperature readings that may not be reliable due to other factors, such as excessive motion during 104 exercise (e.g., as indicated by a motion sensor 245).

The ring 104 (e.g., communication module) may transmit the sampled and/or average temperature data to the user device 106 for storage and/or further processing. The user device 106 may transfer the sampled and/or average temperature data to the server 110 for storage and/or further processing.

Although the ring 104 is illustrated as including a single temperature sensor 240, the ring 104 may include multiple temperature sensors 240 in one or more locations, such as arranged along the inner housing 205-*a* near the user's finger. In some implementations, the temperature sensors 240 may be stand-alone temperature sensors 240. Additionally, or alternatively, one or more temperature sensors 240 may be included with other components (e.g., packaged with other components), such as with the accelerometer and/or processor.

The processing module 230-*a* may acquire and process data from multiple temperature sensors 240 in a similar manner described with respect to a single temperature sensor 240. For example, the processing module 230 may individually sample, average, and store temperature data from each of the multiple temperature sensors 240. In other examples, the processing module 230-*a* may sample the sensors at different rates and average/store different values for the different sensors. In some implementations, the processing module 230-*a* may be configured to determine a single temperature based on the average of two or more temperatures determined by two or more temperature sensors 240 in different locations on the finger.

The temperature sensors 240 on the ring 104 may acquire distal temperatures at the user's finger (e.g., any finger). For example, one or more temperature sensors 240 on the ring 104 may acquire a user's temperature from the underside of a finger or at a different location on the finger. In some implementations, the ring 104 may continuously acquire distal temperature (e.g., at a sampling rate). Although distal temperature measured by a ring 104 at the finger is described herein, other devices may measure temperature at the same/different locations. In some cases, the distal temperature measured at a user's finger may differ from the temperature measured at a user's wrist or other external body location. Additionally, the distal temperature measured at a user's finger (e.g., a "shell" temperature) may differ from the user's core temperature. As such, the ring 104 may provide a useful temperature signal that may not be acquired at other internal/external locations of the body. In some cases, continuous temperature measurement at the finger may capture temperature fluctuations (e.g., small or large fluctuations) that may not be evident in core temperature. For example, continuous temperature measurement at the finger may capture minute-to-minute or hour-to-hour temperature fluctuations that provide additional insight that may not be provided by other temperature measurements elsewhere in the body.

The ring 104 may include a PPG system 235. The PPG system 235 may include one or more optical transmitters that transmit light. The PPG system 235 may also include one or more optical receivers that receive light transmitted by the one or more optical transmitters. An optical receiver may generate a signal (hereinafter "PPG" signal) that indicates an amount of light received by the optical receiver. The optical transmitters may illuminate a region of the user's finger. The PPG signal generated by the PPG system 235 may indicate the perfusion of blood in the illuminated region. For example, the PPG signal may indicate blood volume changes in the illuminated region caused by a user's pulse pressure. The processing module 230-*a* may sample the PPG signal and determine a user's pulse waveform based on the PPG signal. The processing module 230-*a* may determine a variety of physiological parameters based on the user's pulse waveform, such as a user's respiratory rate, heart rate, HRV, oxygen saturation, and other circulatory parameters.

In some implementations, the PPG system 235 may be configured as a reflective PPG system 235 and the optical receiver(s) receive transmitted light that is reflected through the region of the user's finger. In some implementations, the PPG system 235 may be configured as a transmissive PPG system 235 and the optical transmitter(s) and optical receiver(s) are arranged opposite to one another, such that light is transmitted directly through a portion of the user's finger to the optical receiver(s).

The number and ratio of transmitters and receivers included in the PPG system 235 may vary. Example optical transmitters may include light-emitting diodes (LEDs). The optical transmitters may transmit light in the infrared spectrum and/or other spectrums. Example optical receivers may include, but are not limited to, photosensors, phototransistors, and photodiodes. The optical receivers may be configured to generate PPG signals in response to the wavelengths received from the optical transmitters. The location of the transmitters and receivers may vary. Additionally, a single device may include reflective and/or transmissive PPG systems 235.

The PPG system 235 illustrated in FIG. 2 may include a reflective PPG system 235 in some implementations. In these implementations, the PPG system 235 may include a centrally located optical receiver (e.g., at the bottom of the ring 104) and two optical transmitters located on each side of the optical receiver. In this implementation, the PPG system 235 (e.g., optical receiver) may generate the PPG signal based on light received from one or both of the optical transmitters. In other implementations, other placements, combinations, and/or configurations of one or more optical transmitters and/or optical receivers are contemplated.

The processing module 230-*a* may control one or both of the optical transmitters to transmit light while sampling the PPG signal generated by the optical receiver. In some implementations, the processing module 230-*a* may cause the optical transmitter with the stronger received signal to transmit light while sampling the PPG signal generated by the optical receiver. For example, the selected optical transmitter may continuously emit light while the PPG signal is sampled at a sampling rate (e.g., 250 Hz).

Sampling the PPG signal generated by the PPG system 235 may result in a pulse waveform that may be referred to as a "PPG." The pulse waveform may indicate blood pressure vs time for multiple cardiac cycles. The pulse waveform may include peaks that indicate cardiac cycles. Additionally, the pulse waveform may include respiratory induced variations that may be used to determine respiration rate. The processing module 230-*a* may store the pulse waveform in memory 215 in some implementations. The processing module 230-*a* may process the pulse waveform as it is generated and/or from memory 215 to determine user physiological parameters described herein.

The processing module 230-*a* may determine the user's heart rate based on the pulse waveform. For example, the processing module 230-*a* may determine heart rate (e.g., in beats per minute) based on the time between peaks in the pulse waveform. The time between peaks may be referred to as an interbeat interval (IBI). The processing module 230-*a* may store the determined heart rate values and IBI values in memory 215.

The processing module 230-*a* may determine HRV over time. For example, the processing module 230-*a* may determine HRV based on the variation in the IBIs. The processing module 230-*a* may store the HRV values over time in the memory 215. Moreover, the processing module 230-*a* may determine the user's respiratory rate over time. For example, the processing module 230-*a* may determine respiratory rate based on frequency modulation, amplitude modulation, or baseline modulation of the user's IBI values over a period of time. Respiratory rate may be calculated in breaths per minute or as another breathing rate (e.g., breaths per 30 seconds). The processing module 230-*a* may store user respiratory rate values over time in the memory 215.

The ring 104 may include one or more motion sensors 245, such as one or more accelerometers (e.g., 6-D accelerometers) and/or one or more gyroscopes (gyros). The motion sensors 245 may generate motion signals that indicate motion of the sensors. For example, the ring 104 may include one or more accelerometers that generate acceleration signals that indicate acceleration of the accelerometers. As another example, the ring 104 may include one or more gyro sensors that generate gyro signals that indicate angular motion (e.g., angular velocity) and/or changes in orientation. The motion sensors 245 may be included in one or more sensor packages. An example accelerometer/gyro sensor is a Bosch BM1160 inertial micro electro-mechanical system (MEMS) sensor that may measure angular rates and accelerations in three perpendicular axes.

The processing module 230-*a* may sample the motion signals at a sampling rate (e.g., 50 Hz) and determine the motion of the ring 104 based on the sampled motion signals. For example, the processing module 230-*a* may sample acceleration signals to determine acceleration of the ring 104. As another example, the processing module 230-*a* may sample a gyro signal to determine angular motion. In some implementations, the processing module 230-*a* may store motion data in memory 215. Motion data may include sampled motion data as well as motion data that is calculated based on the sampled motion signals (e.g., acceleration and angular values).

The ring 104 may store a variety of data described herein. For example, the ring 104 may store temperature data, such as raw sampled temperature data and calculated temperature data (e.g., average temperatures). As another example, the ring 104 may store PPG signal data, such as pulse waveforms and data calculated based on the pulse waveforms (e.g., heart rate values, IBI values, HRV values, and respiratory rate values). The ring 104 may also store motion data, such as sampled motion data that indicates linear and angular motion.

The ring 104, or other computing device, may calculate and store additional values based on the sampled/calculated physiological data. For example, the processing module 230 may calculate and store various metrics, such as sleep metrics (e.g., a Sleep Score), activity metrics (e.g., an Activity Score), and readiness metrics (e.g., a Readiness Score). In some implementations, additional values/metrics may be referred to as "derived values." The ring 104, or other computing/wearable device, may calculate a variety of values/metrics with respect to motion. Example derived values for motion data may include, but are not limited to, motion count values, regularity values, intensity values, metabolic equivalence of task values (METs), and orientation values. Motion counts, regularity values, intensity values, and METs may indicate an amount of user motion (e.g., velocity/acceleration) over time. Orientation values may indicate how the ring 104 is oriented on the user's finger and if the ring 104 is worn on the left hand or right hand.

In some implementations, motion counts and regularity values may be determined by counting a number of acceleration peaks within one or more periods of time (e.g., one or more 30 second to 1 minute periods). Intensity values may indicate a number of movements and the associated intensity (e.g., acceleration values) of the movements. The intensity values may be categorized as low, medium, and high, depending on associated threshold acceleration values. METs may be determined based on the intensity of movements during a period of time (e.g., 30 seconds), the regularity/irregularity of the movements, and the number of movements associated with the different intensities.

In some implementations, the processing module 230-*a* may compress the data stored in memory 215. For example, the processing module 230-*a* may delete sampled data after making calculations based on the sampled data. As another example, the processing module 230-*a* may average data over longer periods of time in order to reduce the number of stored values. In a specific example, if average temperatures for a user over one minute are stored in memory 215, the processing module 230-*a* may calculate average temperatures over a five minute time period for storage, and then subsequently erase the one minute average temperature data. The processing module 230-*a* may compress data based on a variety of factors, such as the total amount of used/available memory 215 and/or an elapsed time since the ring 104 last transmitted the data to the user device 106.

Although a user's physiological parameters may be measured by sensors included on a ring 104, other devices may measure a user's physiological parameters. For example, although a user's temperature may be measured by a temperature sensor 240 included in a ring 104, other devices may measure a user's temperature. In some examples, other wearable devices (e.g., wrist devices) may include sensors that measure user physiological parameters. Additionally, medical devices, such as external medical devices (e.g., wearable medical devices) and/or implantable medical devices, may measure a user's physiological parameters. One or more sensors on any type of computing device may be used to implement the techniques described herein.

The physiological measurements may be taken continuously throughout the day and/or night. In some implementations, the physiological measurements may be taken during 104 portions of the day and/or portions of the night. In some implementations, the physiological measurements may be taken in response to determining that the user is in a specific state, such as an active state, resting state, and/or a sleeping state. For example, the ring 104 can make physiological measurements in a resting/sleep state in order to acquire cleaner physiological signals. In one example, the ring 104 or other device/system may detect when a user is resting and/or sleeping and acquire physiological parameters (e.g., temperature) for that detected state. The devices/systems may use the resting/sleep physiological data and/or other data when the user is in other states in order to implement the techniques of the present disclosure.

In some implementations, as described previously herein, the ring 104 may be configured to collect, store, and/or process data, and may transfer any of the data described herein to the user device 106 for storage and/or processing. In some aspects, the user device 106 includes a wearable application 250, an operating system (OS) 285, a web browser application (e.g., a web browser 280), one or more additional applications, and a GUI 275. The user device 106 may further include other modules and components, including sensors, audio devices, haptic feedback devices, and the like. The wearable application 250 may include an example of an application (e.g., "app") that may be installed on the user device 106. The wearable application 250 may be configured to acquire data from the ring 104, store the acquired data, and process the acquired data as described herein. For example, the wearable application 250 may include a user interface (UI) module 255, an acquisition module 260, a processing module 230-b, a communication module 220-b, and a storage module (e.g., database 265) configured to store application data.

The various data processing operations described herein may be performed by the ring 104, the user device 106, the servers 110, or any combination thereof. For example, in some cases, data collected by the ring 104 may be pre-processed and transmitted to the user device 106. In this example, the user device 106 may perform some data processing operations on the received data, may transmit the data to the servers 110 for data processing, or both. For instance, in some cases, the user device 106 may perform processing operations that require relatively low processing power and/or operations that require a relatively low latency, whereas the user device 106 may transmit the data to the servers 110 for processing operations that require relatively high processing power and/or operations that may allow relatively higher latency.

In some aspects, the ring 104, user device 106, and server 110 of the system 200 may be configured to evaluate sleep patterns for a user. In particular, the respective components of the system 200 may be used to collect data from a user via the ring 104, and generate one or more scores (e.g., a Sleep Score, a Readiness Score) for the user based on the collected data. For example, as noted previously herein, the ring 104 of the system 200 may be worn by a user to collect data from the user, including temperature, heart rate, HRV, and the like. Data collected by the ring 104 may be used to determine when the user is asleep in order to evaluate the user's sleep for a given "sleep day." In some aspects, scores may be calculated for the user for each respective sleep day, such that a first sleep day is associated with a first set of scores, and a second sleep day is associated with a second set of scores. Scores may be calculated for each respective sleep day based on data collected by the ring 104 during the respective sleep day. Scores may include, but are not limited to, Sleep Scores, Readiness Scores, and the like.

In some cases, "sleep days" may align with the traditional calendar days, such that a given sleep day runs from midnight to midnight of the respective calendar day. In other cases, sleep days may be offset relative to calendar days. For example, sleep days may run from 6:00 pm (18:00) of a calendar day until 6:00 pm (18:00) of the subsequent calendar day. In this example, 6:00 pm may serve as a "cut-off time," where data collected from the user before 6:00 pm is counted for the current sleep day, and data collected from the user after 6:00 pm is counted for the subsequent sleep day. Due to the fact that most individuals sleep the most at night, offsetting sleep days relative to calendar days may enable the system 200 to evaluate sleep patterns for users in such a manner that is consistent with their sleep schedules. In some cases, users may be able to selectively adjust (e.g., via the GUI) a timing of sleep days relative to calendar days so that the sleep days are aligned with the duration of time when the respective users typically sleep.

In some implementations, each overall score for a user for each respective day (e.g., a Sleep Score, a Readiness Score) may be determined/calculated based on one or more "contributors," "factors," or "contributing factors." For example, a user's overall Sleep Score may be calculated based on a set of contributors, including: total sleep, efficiency, restfulness, REM sleep, deep sleep, latency, timing, or any combination thereof. The Sleep Score may include any quantity of contributors. The "total sleep" contributor may refer to the sum of all sleep periods of the sleep day. The "efficiency" contributor may reflect the percentage of time spent asleep compared to time spent awake while in bed, and may be calculated using the efficiency average of long sleep periods (e.g., primary sleep period) of the sleep day, weighted by a duration of each sleep period. The "restfulness" contributor may indicate how restful the user's sleep is, and may be calculated using the average of all sleep periods of the sleep day, weighted by a duration of each period. The restfulness contributor may be based on a "wake up count" (e.g., sum of all the wake-ups (when user wakes up) detected during different sleep periods), excessive movement, and a "got up count" (e.g., sum of all the got-ups (when user gets out of bed) detected during the different sleep periods).

The "REM sleep" contributor may refer to a sum total of REM sleep durations across all sleep periods of the sleep day including REM sleep. Similarly, the "deep sleep" contributor may refer to a sum total of deep sleep durations across all sleep periods of the sleep day including deep sleep. The "latency" contributor may signify how long (e.g., average, median, longest) the user takes to go to sleep, and may be calculated using the average of long sleep periods throughout the sleep day, weighted by a duration of each period and the number of such periods (e.g., consolidation of a given sleep stage or sleep stages may be its own contributor or weight other contributors). Lastly, the "timing" contributor may refer to a relative timing of sleep periods within the sleep day and/or calendar day, and may be calculated using the average of all sleep periods of the sleep day, weighted by a duration of each period.

By way of another example, a user's overall Readiness Score may be calculated based on a set of contributors, including: sleep, sleep balance, heart rate, HRV balance, recovery index, temperature, activity, activity balance, or any combination thereof. The Readiness Score may include any quantity of contributors. The "sleep" contributor may refer to the combined Sleep Score of all sleep periods within the sleep day. The "sleep balance" contributor may refer to a cumulative duration of all sleep periods within the sleep day. In particular, sleep balance may indicate to a user whether the sleep that the user has been getting over some duration of time (e.g., the past two weeks) is in balance with the user's needs (e.g., requirements). Typically, adults need 7-9 hours of sleep a night to stay healthy, alert, and to perform at their best both mentally and physically. However, it is normal to have an occasional night of bad sleep, so the sleep balance contributor takes into account long-term sleep patterns to determine whether each user's sleep needs are being met. The "resting heart rate" contributor may indicate a lowest heart rate from the longest sleep period of the sleep day (e.g., primary sleep period) and/or the lowest heart rate from naps occurring after the primary sleep period.

Continuing with reference to the "contributors" (e.g., factors, contributing factors) of the Readiness Score, the "HRV balance" contributor may indicate a highest HRV average from the primary sleep period and the naps happening after the primary sleep period. The HRV balance contributor may help users keep track of their recovery status by comparing their HRV trend over a first time period (e.g., two weeks) to an average HRV over some second, longer time period (e.g., three months). The "recovery index" contributor may be calculated based on the longest sleep period. Recovery index measures how long it takes for a user's resting heart rate to stabilize during the night. A sign of a very good recovery is that the user's resting heart rate stabilizes during the first half of the night, at least six hours before the user wakes up, leaving the body time to recover for the next day. The "body temperature" contributor may be calculated based on the longest sleep period (e.g., primary sleep period) or based on a nap happening after the longest sleep period if the user's highest temperature during the nap is at least 0.5° C. higher than the highest temperature during the longest period. In some aspects, the ring may measure a user's body temperature while the user is asleep, and the system 200 may display the user's average temperature relative to the user's baseline temperature. If a user's body temperature is outside of their normal range (e.g., clearly above or below 0.0), the body temperature contributor may be highlighted (e.g., go to a "Pay attention" state) or otherwise generate an alert for the user.

In some aspects, the system 200 may support techniques for temperature measurement according to a calibrated temperature. In particular, the system 200 illustrated in FIG. 2 may support techniques for temperature calibration at a wearable device 104 (e.g., a ring 104). For example, a wearable device 104 (e.g., a ring 104) may activate a set of temperature sensors 240 associated with the wearable device 104. The set of temperature sensors 240 may include a primary temperature sensor and one or more secondary temperature sensors. The wearable device 104 (e.g., a ring 104) may determine a trigger to calibrate the one or more secondary temperature sensors based at least in part on one or more conditions. As such, the wearable device 104 (e.g., a ring 104) may calibrate the one or more secondary temperature sensors using the primary temperature sensor based at least in part on the trigger. The wearable device 104 (e.g., a ring 104) may process temperature data associated with a user that is received from one or more of the primary temperature sensor or the one or more secondary temperature sensors associated with the set of temperature sensors 240 based at least in part on the calibrating. The processing of the temperature data may be performed by any of the components of the system 200, including the wearable device 104, the user device 106, the server 110, or any combination thereof.

In some implementations, temperature data acquired by the set of temperature sensors 240 associated with the wearable device 104 may include distal temperatures at a user's finger (e.g., any finger). For example, one or more temperature sensors of the set of temperature sensors 240 associated with the wearable device 104 may acquire a user's temperature from an underside of a finger or at a different location on the finger. In some other implementations, the wearable device 104 may continuously acquire the distal temperatures (e.g., at a sampling rate). The distal temperature measured at a user's finger may differ from the temperature measured at a user's wrist or other external body location.

In some implementations, a distal temperature measured at a user's finger may differ from a user's core temperature. As such, the wearable device 104 may provide a useful temperature signal that may not be acquired at other internal and/or external locations of the body (e.g., in the mouth or other location). In some cases, continuous temperature measurement at a finger of a user may capture temperature fluctuations (e.g., small or large fluctuations) that may not be evident in core temperature. For example, continuous temperature measurement at the finger may capture minute-to-minute or hour-to-hour temperature fluctuations that provide additional insight that may not be provided by other temperature measurements elsewhere in the body.

Figure 3:
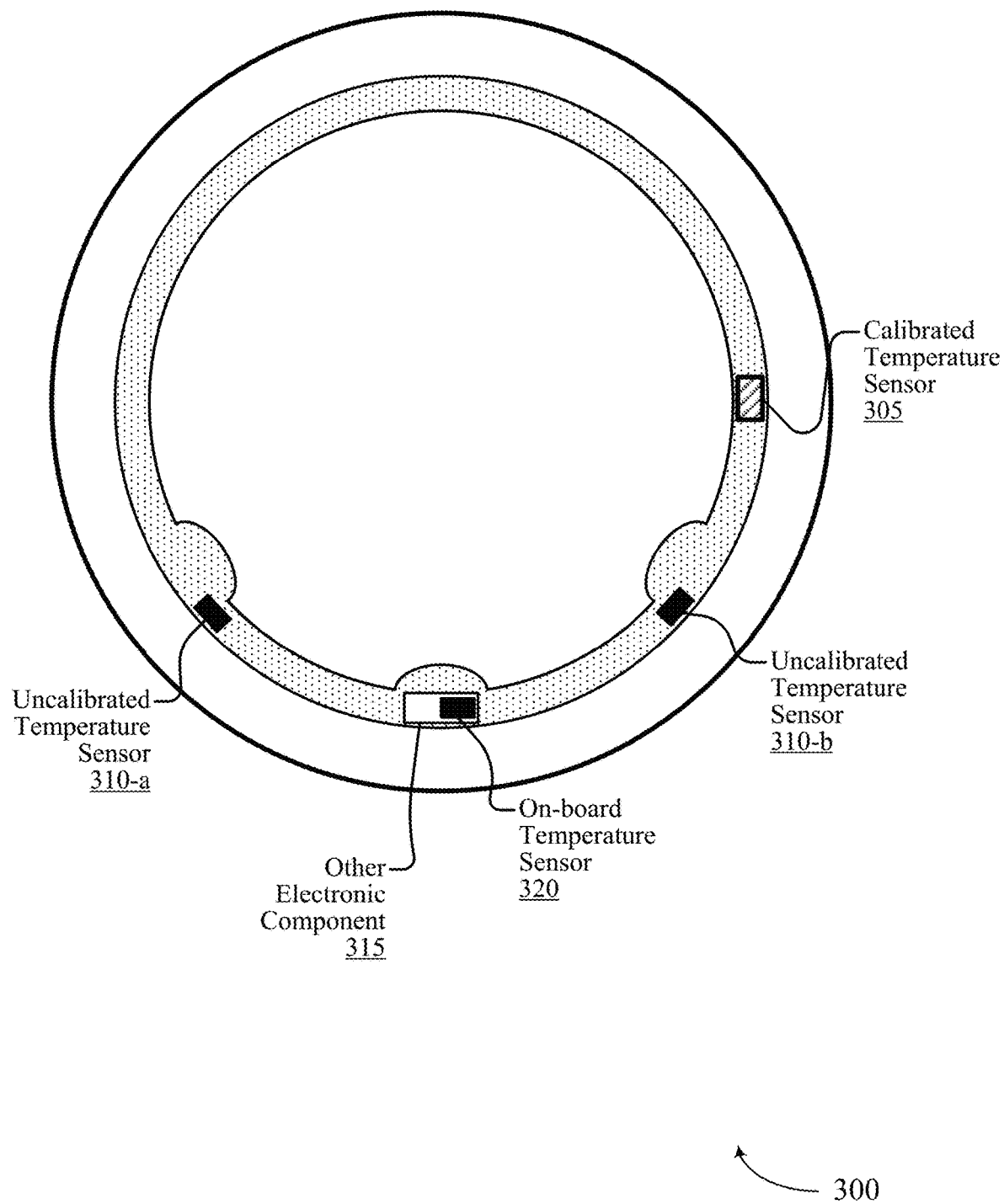
FIGS. 3 through 5 illustrate examples of wearable devices that support techniques for temperature measurement according to a calibrated temperature in accordance with aspects of the present disclosure.

FIG. 3 illustrates an example of a wearable device 300 that supports techniques for temperature measurement according to a calibrated temperature in accordance with aspects of the present disclosure. FIG. 3 may also illustrate a side view of the wearable device 300. The wearable device 300 may implement, or be implemented by, aspects of the system 100 or the system 200, or any combination thereof. For example, the wearable device 300 may process temperature data indicating a user's temperature or other measured temperatures (e.g., ambient temperature). In some implementations, the wearable device 300 may determine a temperature of the user at a user's finger over time based on received temperature data.

The wearable device 300 may include a set of temperature sensors including a calibrated temperature sensor 305 (also referred to as a primary temperature sensor) and one or more uncalibrated temperature sensors 310-*a*, 310-*b* (also referred to as secondary temperature sensors). In some implementations, one or more temperature sensors of the set of temperature sensors, may be configured on a bottom portion of the wearable device 300 (e.g., a ring). In some implementations, one or more temperature sensors of the set of temperature sensors may be mounted on rigid portions of a PCB (e.g., at a bottom of a PCB) or on flexible portions of the PCB.

Example temperature sensors may include a thermistor, such as an NTC thermistor, or other types of temperature sensors including resistors, transistors, diodes, and/or other electrical/electronic components. The set of temperature sensors may measure temperatures in different locations around the user's finger. Although the wearable device 300 illustrated and described herein includes a single calibrated temperature sensor 305 and a plurality of uncalibrated temperature sensors 310, various aspects of the present disclosure may be implemented in wearable devices that have other combinations and numbers of calibrated and uncalibrated temperature sensors.

The set of temperature sensors may be stand-alone sensors. The wearable device 300 may also include other electronic components 315 (e.g., processor, memory, and the like). Additionally, or alternatively, one or more temperature sensors of the set of temperature sensors associated with the wearable device 300 may be configured with other components. For example, one or more temperature sensors of the set of temperature sensors associated with the wearable device 300 may be included on a same integrated circuit with another component and/or in the same package with other components. Temperature sensors that are included with other components may be referred to as "on-board" temperature sensors 320. For example, the on-board temperature sensor 320 may be included in a microcontroller or other component, such as a motion sensor (e.g., accelerometer/gyro sensor). Additional on-board temperature sensors may be included in the wearable device 300 in other implementations.

Figure 4:
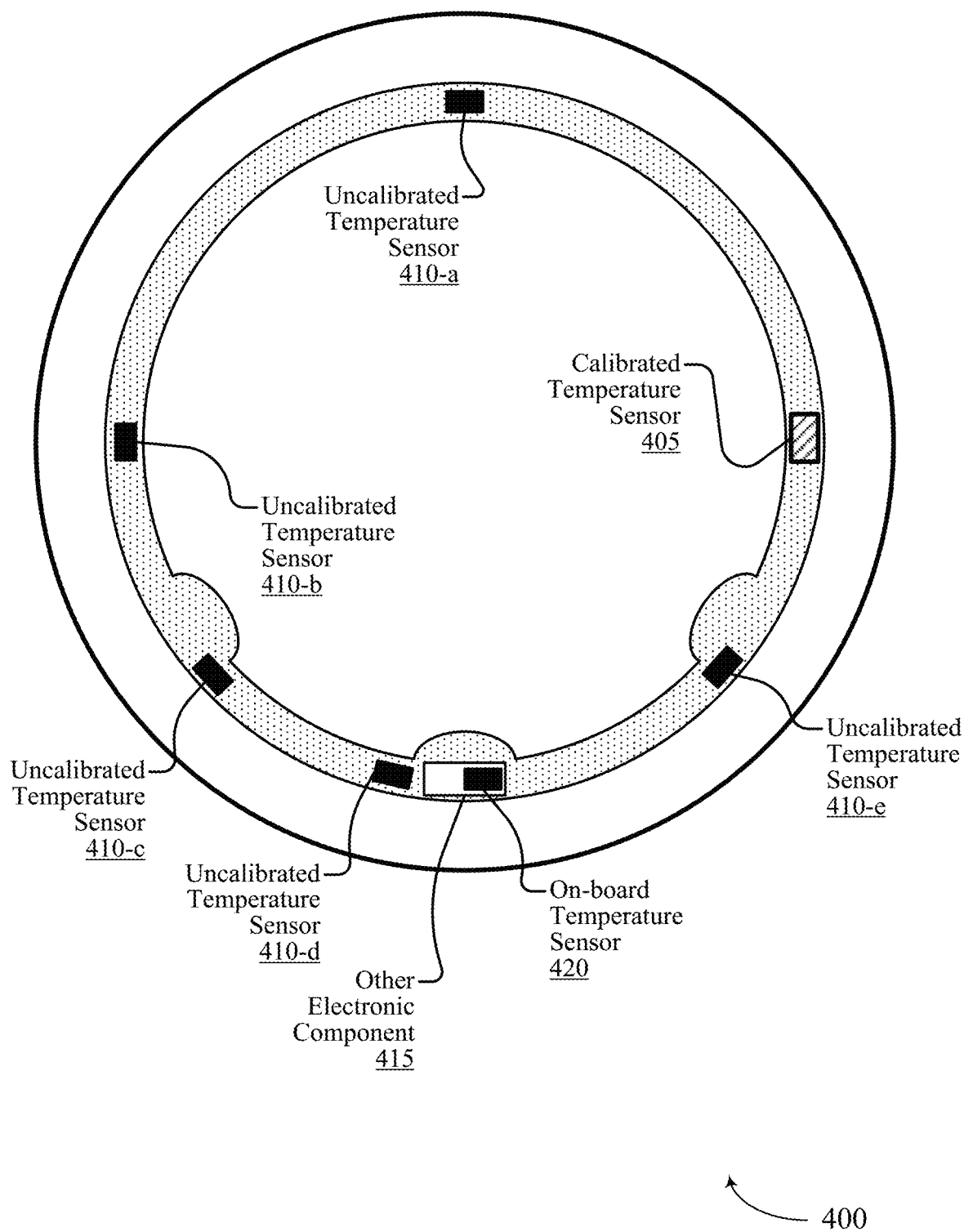

FIG. 4 illustrates an example of a wearable device 400 that supports techniques for temperature measurement according to a calibrated temperature in accordance with aspects of the present disclosure. FIG. 4 may also illustrate a side view of the wearable device 400. The wearable device 400 may implement, or be implemented by, aspects of the system 100 or the system 200, or any combination thereof. For example, the wearable device 400 may process temperature data indicating a user's temperature or other measured temperatures (e.g., ambient temperature). In some implementations, the wearable device 400 may determine a temperature of the user at a user's finger over time based on received temperature data.

The wearable device 400 may include a set of temperature sensors including a calibrated temperature sensor 405 (also referred to as a primary temperature sensor) and one or more uncalibrated temperature sensors 410-a, 410-b, 410-c, 410-d, 410-e (also referred to as secondary temperature sensors). The set of temperature sensors may measure temperatures in different locations around the user's finger. For example, arrangement of the temperature sensors around the wearable device 400 (e.g., bottom, side, and top portions) may help ensure that one or more of the temperature sensors may accurately read a user's temperature for different rotational orientations of the wearable device 400 (e.g., ring). The wearable device 400 may include an external interface and an internal interface. The internal interface may have a circular geometry and the arrangement of the temperature sensors, including the calibrated temperature sensor 405 and one or more of the uncalibrated temperature sensors 410 may be positioned on the internal interface of the wearable device 400 to contact a finger of a user associated with the wearable device 400. Although the wearable device 400 illustrated and described herein includes a single calibrated temperature sensor 405 and a plurality of uncalibrated temperature sensors 410, various aspects of the present disclosure may be implemented in wearable devices that have other combinations and numbers of calibrated and uncalibrated temperature sensors.

The wearable device 400 may include other electronic components 415 (e.g., processor, memory, and the like). Additionally, or alternatively, one or more temperature sensors of the set of temperature sensors associated with the wearable device 400 may be configured with other components. Temperature sensors that are included with other components may be referred to as on-board temperature sensors, such as an on-board temperature sensor 420. Additional on-board temperature sensors may be included in the wearable device 400 in other implementations.

Figure 5:
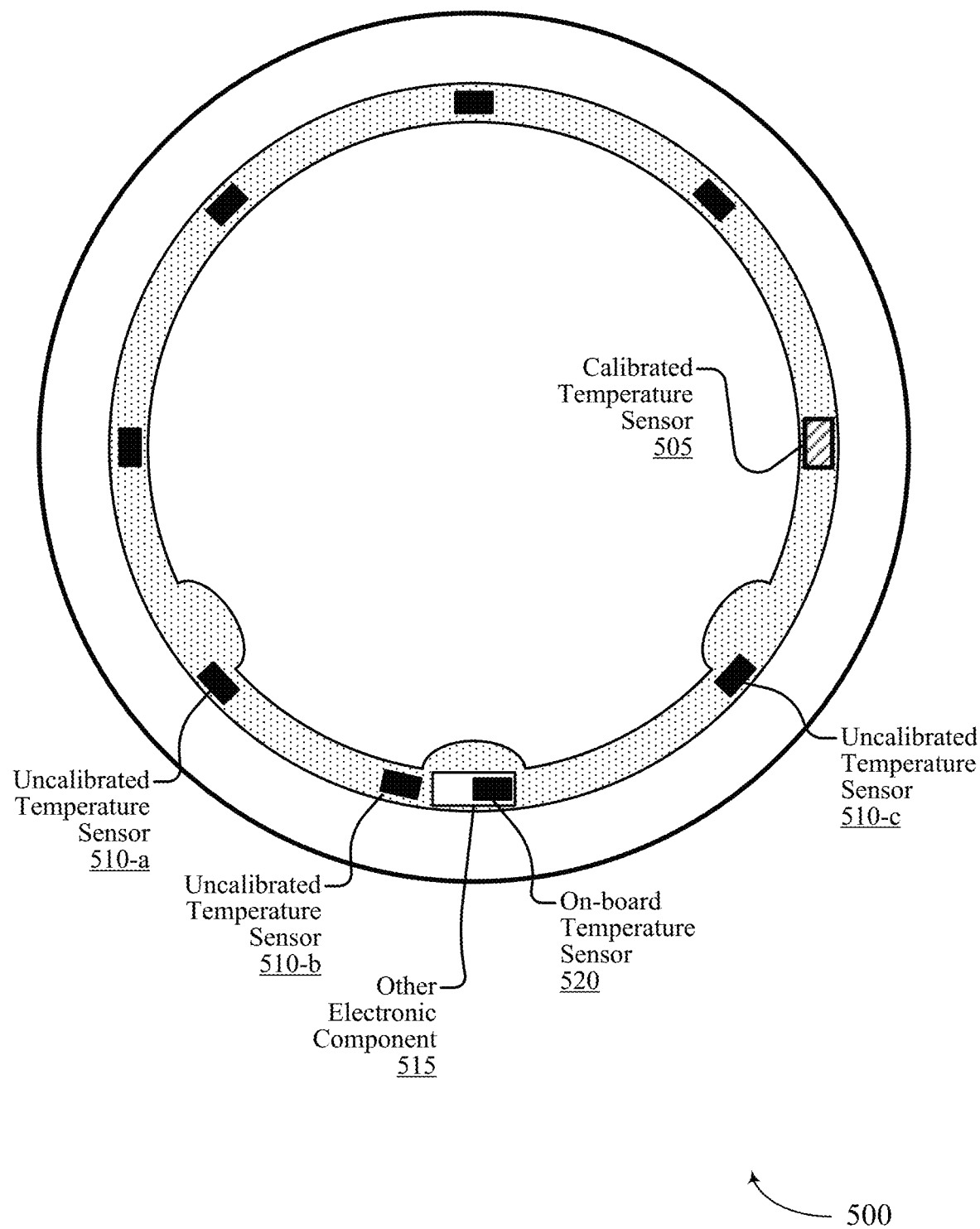

FIG. 5 illustrates an example of a wearable device 500 that supports techniques for temperature measurement according to a calibrated temperature in accordance with aspects of the present disclosure. FIG. 5 may also illustrate a side view of the wearable device 500. The wearable device 500 may implement, or be implemented by, aspects of the system 100 or the system 200, or any combination thereof. For example, the wearable device 500 may process temperature data indicating a user's temperature or other measured temperatures (e.g., ambient temperature). In some implementations, the wearable device 500 may determine a temperature of the user at a user's finger over time based on received temperature data.

The wearable device 500 may include a set of temperature sensors including a calibrated temperature sensor 505 (also referred to as a primary temperature sensor) and one or more uncalibrated temperature sensors 510-a, 510-b, 510-c (also referred to as secondary temperature sensors). The set of temperature sensors may measure temperatures in different locations around the user's finger. For example, arrangement of the temperature sensors around the wearable device 500 (e.g., bottom, side, and top portions) may help ensure that one or more of the temperature sensors may accurately read a user's temperature for different rotational orientations of the wearable device 500 (e.g., ring). Although the wearable device 500 illustrated and described herein includes a single calibrated temperature sensor 505 and a plurality of uncalibrated temperature sensors 510, various aspects of the present disclosure may be implemented in wearable devices that have other combinations and numbers of calibrated and uncalibrated temperature sensors.

The wearable device 500 may also include other electronic components 515 (e.g., processor, memory, and the like). Additionally, or alternatively, one or more temperature sensors of the set of temperature sensors associated with the wearable device 500 may be configured with other components. Temperature sensors that are included with other components may be referred to as on-board temperature sensors, such as an on-board temperature sensor 520. Additional on-board temperature sensors may be included in the wearable device 500 in other implementations.

Figure 6:
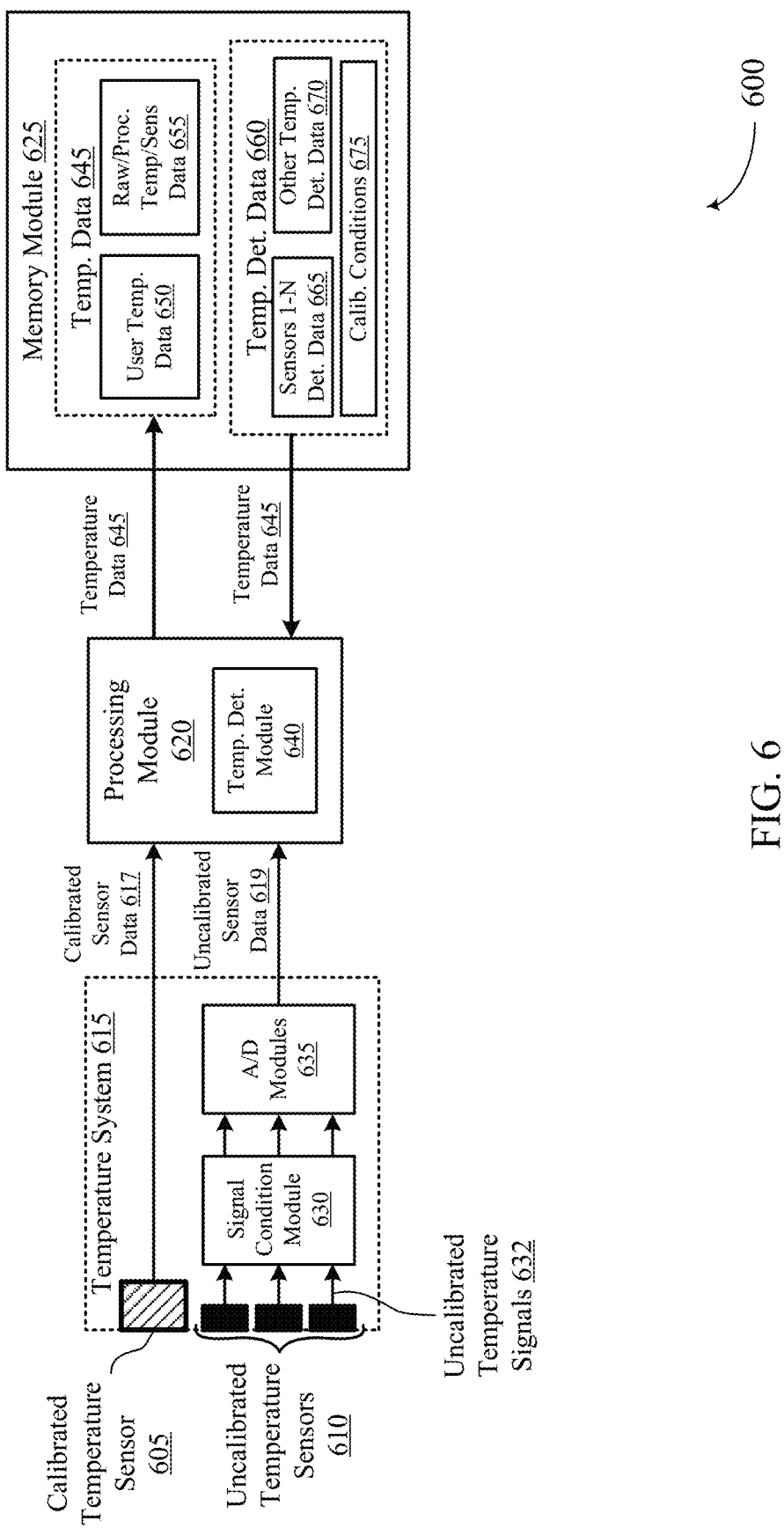
FIGS. 6 and 7 illustrate examples of systems that support techniques for temperature measurement according to a calibrated temperature in accordance with aspects of the present disclosure.

FIG. 6 illustrates an example of a system 600 that supports techniques for temperature measurement according to a calibrated temperature in accordance with aspects of the present disclosure. The system 600 may implement, or be implemented by, aspects of the system 100 or the system 200, or any combination thereof. For example, the system 600 may include a calibrated temperature sensor 605, a plurality of uncalibrated temperature sensors 610, a temperature system 615, a processing module 620, and a memory module 625. The temperature system 615 may include a signal condition module 630 that may receive uncalibrated temperature signals 632, an A/D module 635 (e.g., one or more A/D converter circuits), and/or other circuits. The processing module 620 may include a temperature determination module 640. In some implementations, the processing module 620 may receive calibrated sensor data 617 and uncalibrated sensor data 619 from the temperature system 615 and process the received calibrated sensor data 617 and uncalibrated sensor data 619 via the temperature determination module 640. The memory module 625 may include (e.g., store) temperature data 645 (e.g., user temperature data 650, raw/processing temperature sensor data 655) and/or temperature determination data 660 (e.g., sensors 1-N determination data 665, other temperature determination data 670, and/or calibration conditions 675).

Figure 7:
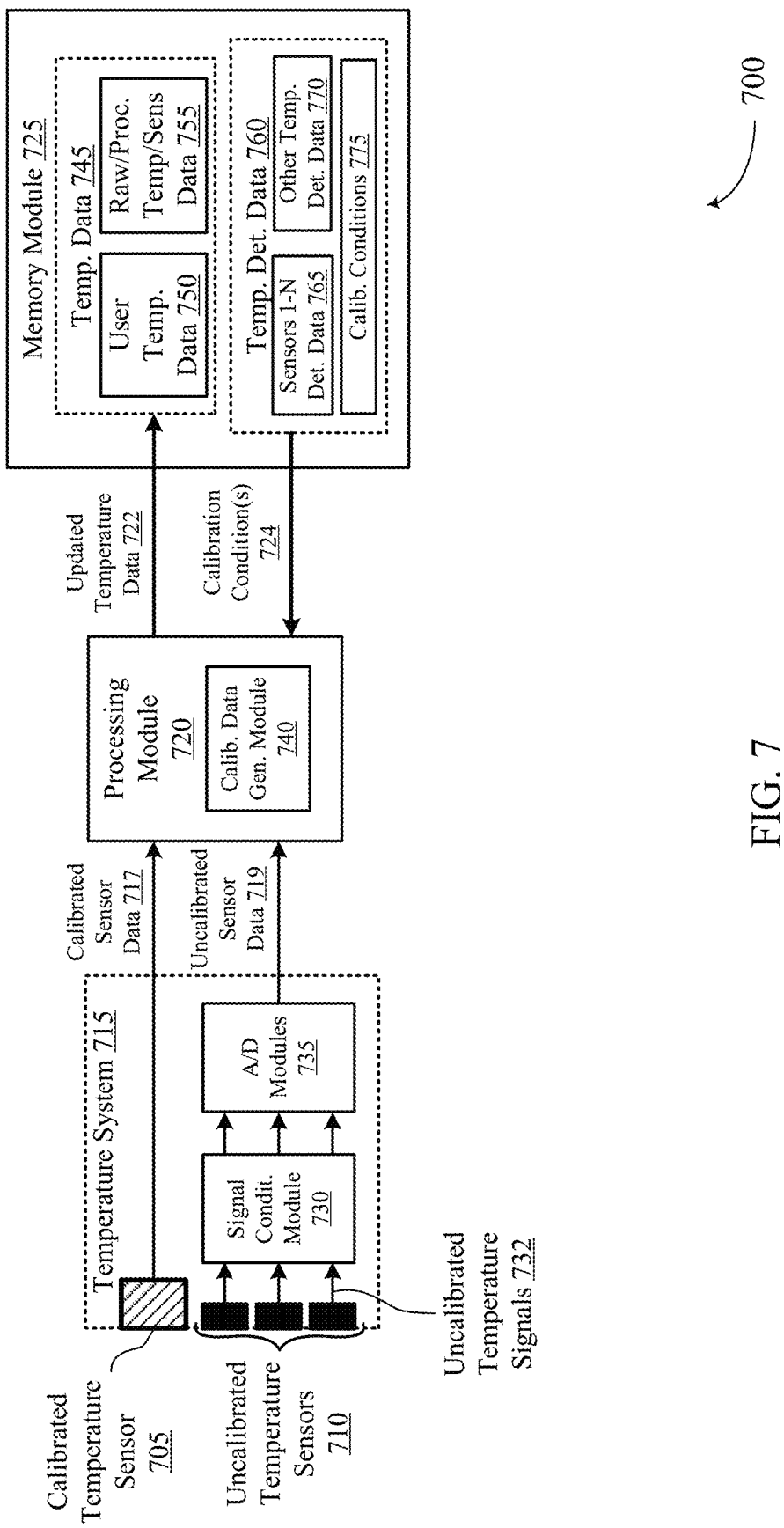

FIG. 7 illustrates an example of a system 700 that supports techniques for temperature measurement according to a calibrated temperature in accordance with aspects of the present disclosure. The system 700 may implement, or be implemented by, aspects of the system 100 or the system 200, or any combination thereof. For example, the system 700 may include a calibrated temperature sensor 705, a plurality of uncalibrated temperature sensors 710, a temperature system 715, a processing module 720, and a memory module 725. The temperature system 715 may include a signal condition module 730 that may receive uncalibrated temperature signals 732, an A/D module 735 (e.g., one or more A/D converter circuits), and/or other circuits. The processing module 720 may include a calibration data generation module 740. In some implementations, the processing module 720 may receive calibrated sensor data 717 and uncalibrated sensor data 719 from the temperature system 715 and process the received calibrated sensor data 717 and uncalibrated sensor data 719 via the calibration data generation module 740.

The memory module 725 may include (e.g., store) temperature data 745 (e.g., user temperature data 750, raw/processing temperature sensor data 755) and/or temperature determination data 760 (e.g., sensors 1-N determination data 765, other temperature determination data 770, and/or calibration conditions 775). In some implementations, the processing module 720 may forward updated temperature data 722 to the memory module 725. In some implementations, the memory module 725 may forward calibration conditions 724 to the processing module 720.

With reference to FIGS. 6 and 7, the calibrated temperature sensor may generate calibrated temperature sensor data (also referred to as calibrated sensor data). The example calibrated temperature sensor may represent a calibrated sensor package that includes a temperature sensor and additional circuits that generate the calibrated sensor data indicating the temperature in the area of the calibrated temperature sensor. The uncalibrated temperature sensors may generate uncalibrated temperature signals. The temperature modules (e.g., circuits) may generate uncalibrated temperature sensor data ("uncalibrated sensor data") based on the uncalibrated temperature signals. The temperature modules may include signal condition modules (e.g., circuits), A/D modules (e.g., one or more A/D converter circuits), and/or other circuits. In some implementations, an NTC circuit may include a filtered operating voltage, a series pullup resistor, a buffer circuit (e.g., an op-amp buffer), and an A/D converter circuit. Although the calibrated temperature sensor may be included in a package with dedicated circuits that generate calibrated sensor data, in other implementations, a calibrated temperature sensor may use additional circuits in a similar manner as the uncalibrated sensors.

In some implementations, a temperature sensor may contact the user's skin. In other implementations, a portion of the housing (e.g., the inner housing) may form a barrier (e.g., a thin thermally conductive barrier) between a temperature sensor and the user's skin. In some implementations, portions of a wearable device (e.g., a ring) configured to contact the user's finger may have thermally conductive portions and thermally insulative portions. The thermally conductive portions may conduct heat from the user's finger to a temperature sensor. The thermally insulative portions may insulate portions of the wearable device (e.g., the temperature sensor) from ambient temperature. In some implementations, the multiple temperature sensors may be located at different depths in the wearable device shank.

A calibrated temperature sensor may be calibrated by the sensor manufacturer and/or the wearable device manufacturer to provide accurate temperature readings. The calibrated sensor signals/data may provide a more accurate temperature reading than the uncalibrated temperature sensors (e.g., prior to calibration operations). The wearable device may perform calibration operations using the calibrated sensor data as a reference in order to acquire more accurate temperature readings from the uncalibrated temperature sensors.

The processing modules may include temperature determination data ("determination data") that the wearable device uses to determine temperature data (e.g., user temperature data) based on temperature sensor data. For example, the wearable device may use the determination data to determine a single temperature value for a single digital sensor data value. The determination data may include a variety of different types of data that are used to determine temperature based on received sensor data. Example determination data may include, but is not limited to, tables (e.g., lookup tables), interpolation equations for lookup tables, extrapolation equations, and/or other mathematical functions. The processing module (e.g., calibration data generation module of FIG. 7) may generate the determination data based on calibration operations.

Although some processing may be performed on the calibrated sensor data, in some implementations, the calibrated temperature sensor may output temperature data directly (e.g., without additional processing). For example, the calibrated sensor data may be directly used as temperature data without additional processing. The processing module (e.g., a temperature determination module of FIG. 6) may process received uncalibrated sensor data according to determination data in order to generate temperature data for the uncalibrated sensor data. For example, the processing module may use a lookup table that matches uncalibrated sensor data to temperatures in order to determine a temperature associated with the uncalibrated sensor data. In some examples, the processing module may further process the data from the lookup table, such as by implementing an interpolation function to determine a more accurate temperature than is directly provided by the table.

The uncalibrated temperature sensors may vary in their accuracies. For example, each uncalibrated temperature sensor may provide slightly different uncalibrated sensor data (e.g., due to manufacturing tolerances). The wearable device (e.g., memory) may store determination data for each sensor in order to compensate for differences between the uncalibrated sensors. Each sensor may also change in operation over time. Using different determination data for each sensor may also compensate for changes over time in the operation of individual sensors. FIGS. 6 and 7 illustrate example determination data for N uncalibrated sensors. For example, the memory module includes Sensors 1-N Determination Data.

The processing module may store different types of temperature data in memory. In some implementations, the temperature data may include raw sampled temperature data from each sensor. In some implementations, the temperature data may include processed temperature data, such as average temperatures over time for a single sensor or multiple sensors. In some implementations, the memory module may also store sensor data used to generate the temperature data (e.g., for later processing). Note that each temperature sensor may not necessarily generate temperature values that are indicative of the user's distal temperature. For example, some sensors that are not thermally interfaced with the finger may not accurately reflect a user's distal temperature. As another example, some temperatures may indicate ambient temperature from surrounding air/fluids.

The stored temperature data may include user temperature data that may refer to temperature data that indicates a determined distal user temperature (e.g., after processing). The distal user temperature may refer to a final temperature value that is used to indicate the user's temperature (e.g., after processing). The wearable device may store the user's distal temperature over time and use the stored distal temperature for a variety of determinations (e.g., illness detection).

The wearable device may include initial temperature determination data. Initial temperature determination data may be included on the wearable device as initially fabricated and programmed. Example initial temperature determination data may include, but is not limited to, initial lookup tables, equations, and functions for each sensor. The initial temperature determination data may be updated over time based on calibration operations described herein. Calibration operations may result in updated temperature determination data. For example, a calibration may result in updated tables, updated/new calibration values, updated/new interpolation equations, updated/new extrapolation equations, and/or updated/new functions. In some implementations, the wearable device may store historic determination data. In some implementations, the wearable device may store values (e.g., "calibration values") that the processing module may use to modify the initial temperature determination data. Example updated calibration values may modify offsets and/or slopes in temperature-resistance curves of the determination data. Temperature-resistance curves may refer to curves that indicate temperature based on uncalibrated sensor data values. In some implementations, the wearable device may overwrite the previous determination data with new updated determination data. The determination data for each calibration operation may be stored over time as historic determination data.

The wearable device (e.g., ring) may perform one or more calibration operations over time. In some implementations, the ring may perform one or more calibration operations after manufacturing (e.g., at the factory), but before purchase by the user. For example, a ring may perform calibration operations at one or more different temperatures prior to purchase by the user. In these implementations, the customer may receive a ring that includes determination data that resulted from one or more previous calibrations. Additionally, or alternatively, the wearable device may perform calibration operations after user acquisition. In some implementations, the wearable device may perform calibration operations in response to the satisfaction of one or more conditions (e.g., calibration conditions). A variety of example conditions are described herein. The conditions may occur before or after customer acquisition of the wearable device. The wearable device may perform calibration operations in response to any combination of one or more calibration conditions described herein.

In some implementations, the calibration conditions may include conditions that are satisfied at the factory prior to shipping the device to stores/users (e.g., before packaging the wearable device). In implementations where the wearable device implements calibration operations after manufacture, but before customer purchase, the wearable device may be configured to perform the calibration operations based on a variety of preset calibration conditions. For example, a ring may be configured to perform calibration operations in response to detection of a preset temperature at the factory (e.g., an already existing factory temperature). In some implementations, multiple temperatures may be used for calibration at the factory. Additionally, or alternatively, the calibration conditions at the factory may also include a detected lack of motion for a period of time. In some implementations, the calibration operations may be implemented at preset times. In some implementations, the wearable device may perform calibration operations in response to a calibration command from another device, such as a computing device that triggers the wearable device to perform a calibration operation. The wearable devices (e.g., rings) may be calibrated individually or in a batch.

In some implementations, the wearable device may be configured to perform calibration operations in response to one or more calibration conditions that may occur after a customer purchases the wearable device. The calibration conditions may occur at any time after the customer purchases the wearable device. For example, the calibration conditions may occur after the wearable device is first turned on (e.g., after unboxing the ring). The calibration conditions may also occur during or after wearing of the wearable device. For example, the calibration conditions may be satisfied while the wearable device is off the user's finger (e.g., on a table/charger). In some implementations, the wearable device may be configured to perform calibration operations shortly after the user purchases the wearable device. For example, calibration conditions may include a power-on calibration condition that causes the wearable device to perform calibration operations after the wearable device is first powered on. In some implementations, the wearable device may notify the user (e.g., via the ring application) that the wearable device should be placed on the charger or in a stable location for initial calibration operations. In some implementations, the user may interact with the wearable device application to send a user-generated calibration command to the wearable device. The wearable device may perform calibration operations in response to receipt of the user-generated calibration command.

In some implementations, calibration conditions may be configured such that the wearable device is at a stable temperature for a period of time and/or motionless for a period of time in order for calibration operations to begin. In some implementations, calibration conditions may include a condition that a plurality of the temperature sensors (e.g., all temperature sensors) are at a stable temperature for a period of time. These conditions may ensure that the wearable device is not being worn by a user that will subject the wearable device to temperature fluctuations. In some implementations, the wearable device may also include a calibration condition based on PPG data, such as condition that PPG data indicates the wearable device is not being worn. Although calibration operations may be performed while the wearable device is stationary and not being worn by a user, the wearable device may perform calibration operations if calibration conditions are satisfied while a user is wearing the wearable device. For example, calibration conditions may be satisfied while a user is wearing the wearable device at night at a relatively stable temperature.

In some implementations, the wearable device may include a charging condition that indicates the wearable device should be on a charger and/or charged a threshold amount before performing calibration operations. In some implementations, the calibration conditions may specify that the wearable device should be in a specific orientation (e.g., on the charger) for a period of time prior to performing calibration operations. In some implementations, calibration conditions may include timing conditions. For example, timing conditions may include a time of day/night or a time range during the day/night for calibration operations. For example, a wearable device may be configured to perform calibration operations during the night when a user is not wearing the wearable device. Calibration conditions may also include timing conditions based on the last calibration. For example, an elapsed time condition may indicate that calibration operations be performed if calibration operations have not been performed within a threshold period of time (e.g., within a period of weeks, months, or years).

In some implementations, the wearable device may be configured to perform calibration operations at a plurality of different temperatures. In these implementations, calibration conditions may include one or more temperatures and/or temperature ranges for performing calibration operations. In these implementations, the wearable device may perform calibration operations in response to the wearable device being at new temperatures that are different than previous temperatures used for calibration. Using multiple calibration temperatures may increase accuracy of the uncalibrated temperature sensors for a larger range of temperatures. For example, multiple calibration temperatures may allow for more adjustments to the initial temperature determination data, such as offset and/or slope adjustments to table/curve data. The additional calibration temperatures may also allow for more adjustments to equations (e.g., interpolation/extrapolation equations) and other functions used to determine user temperature.

Figure 8:
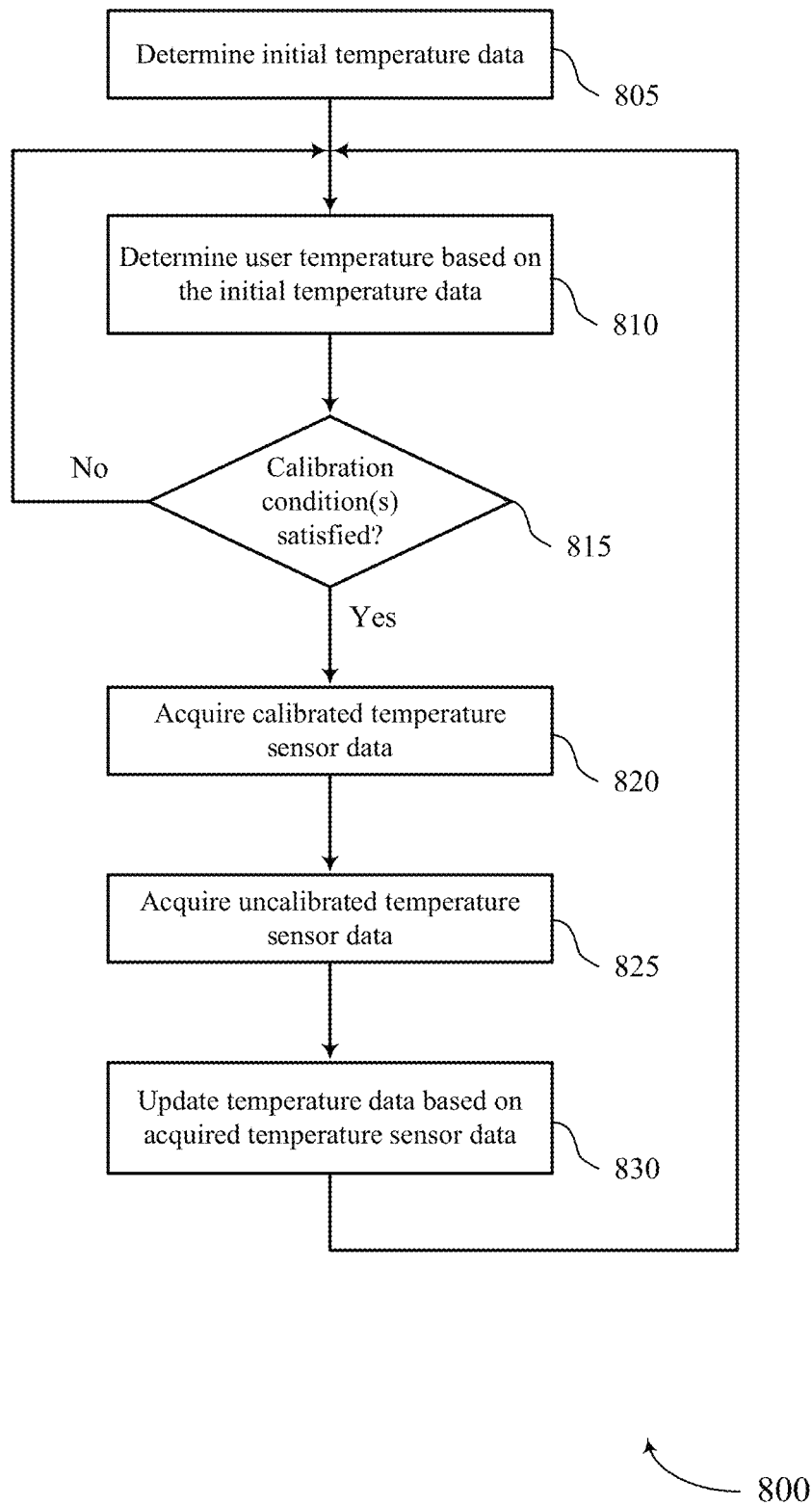
FIG. 8 illustrates an example of a method that supports techniques for temperature measurement according to a calibrated temperature in accordance with aspects of the present disclosure.

FIG. 8 illustrates an example of a method 800 that supports techniques for temperature measurement according to a calibrated temperature in accordance with aspects of the present disclosure. The operations of the method 800 may be implemented by a wearable device or its components as described herein. For example, the operations of the method 800 may be performed by a wearable device 104 as described with reference to FIGS. 1 through 7. In some examples, a wearable device 104 may execute a set of instructions to control the functional elements of the wearable device 104 to perform the described functions. Additionally, or alternatively, a wearable device 104 may perform aspects of the described functions using special-purpose hardware.

At 805, the wearable device 104 may determine initial temperature data. In some implementations, the wearable device 104 may be loaded with initial temperature data after fabrication. The wearable device 104 may update the temperature data over time according to the method 800. In the example of FIG. 8, it may be assumed that calibration operations are not performed at the factory prior to shipping the wearable device 104 to stores/users. Instead, the first calibration operations may be performed after a user starts using the wearable device 104 for the first time. At 810, the wearable device 104 may determine a user temperature over time using the initial temperature data (e.g., before a first calibration operation).

At 815, the wearable device 104 may determine whether one or more calibration conditions are satisfied. At 820, the wearable device 104 may acquire calibrated temperature sensor data that may indicate an accurate temperature. At 825, the wearable device 104 may acquire uncalibrated temperature sensor data for one or more uncalibrated sensors. At 830, the wearable device 104 may update temperature data based on the acquired temperature sensor data (e.g., one or more of the acquired calibrated temperature sensor data or the acquired uncalibrated temperature sensor data), for the one or more uncalibrated sensors so that the temperatures indicated by the uncalibrated temperature sensor data reflect the accurate temperature indicated by the calibrated temperature sensor data. The wearable device 104 may measure a user's temperature based on the updated temperature data.

In some implementations, the wearable device 104 may be configured to perform multiple calibration operations over time in the response to satisfaction of calibration conditions. In some other implementations, the calibration conditions may remain the same for future calibration operations. In other implementations, the calibration conditions may change for future calibration operations. For example, future calibration conditions may be triggered for different stable temperatures in the case the wearable device is configured to perform calibration operations for different temperatures.

Although the wearable device 104 may perform the calibration operations and update the temperature data, in some implementations, calibration operations may be performed by any of the components of the system 100 and 200, including the wearable device 104, the user device 106 associated with User 102, the one or more servers 110, or any combination thereof. For example, a wearable device 104 may transmit historical sensor data, historical temperature data, historical determination data, and/or other data (e.g., motion data, PPG data, etc.) to the user device 106 associated with User 102, the one or more servers 110, or any combination thereof for calibration operations. In these implementations, the other computing device may generate updated temperature data that may be transferred back to the wearable device 104. Although the wearable device 104 may perform calibration operations locally and then subsequently use the updated temperature data to determine future user temperature data, in some implementations, the wearable device 104 (or other computing device) may perform calibration operations and apply the updated temperature data to previously collected temperature data.

The wearable device 104 may perform temperature compensation operations that may compensate for temperature differences between different sensors. For example, temperature sensors near heated electronic components may provide higher temperature readings. In these implementations, the wearable device 104 may determine temperature elevations due to electrical heating. In some implementations, the wearable device 104 may drive electronic components, such as a processor, during calibration operations in order to determine an amount of temperature elevation due to component heating.

The wearable device 104 may acquire the user's temperature from one or more temperature sensors over time. The wearable device 104 may acquire user temperature from any of the temperature sensors (e.g., calibrated or uncalibrated sensors). The wearable device 104 may acquire the user's temperature according to a sampling rate. An example sampling rate may include one sample per five seconds (e.g., for each sensor), although the wearable device 104 may be configured to acquire temperatures at other sampling rates. In some implementations, the wearable device 104 may sample the user's temperature continuously throughout the day and night. Sampling at a rate (e.g., one sample per five seconds) throughout the day/night may provide adequate temperature data for analysis. The sampling rate may be stored in memory of the wearable device 104 or other device and, the sampling rate may be configurable.

The wearable device 104 may process the temperature data. For example, the wearable device 104 may determine and store average temperature values over a period of time. In some implementations, the wearable device 104 may filter temperature readings, such as large spikes in temperature that are not indicative of physiological changes (e.g., a temperature spike from a hot shower) and/or readings that may not be reliable due to other factors, such as excessive motion during exercise (e.g., as indicated by a motion sensor). The wearable device 104 may acquire and process data for multiple temperature sensors in a similar manner described with respect to a single temperature sensor. In some implementations, the wearable device 104 may be configured to determine a single temperature based on the average of two or more temperatures determined by two or more temperature sensors in different locations on the finger.

The wearable device 104 may store the temperature data in memory. In some implementations, the memory may store average temperatures (e.g., one per minute) instead of sampled temperatures in order to conserve memory. The wearable device may transmit temperature data to a user device for storage and/or further processing. The user device may transfer the temperature data to the server for storage and/or further processing.

Figure 9:
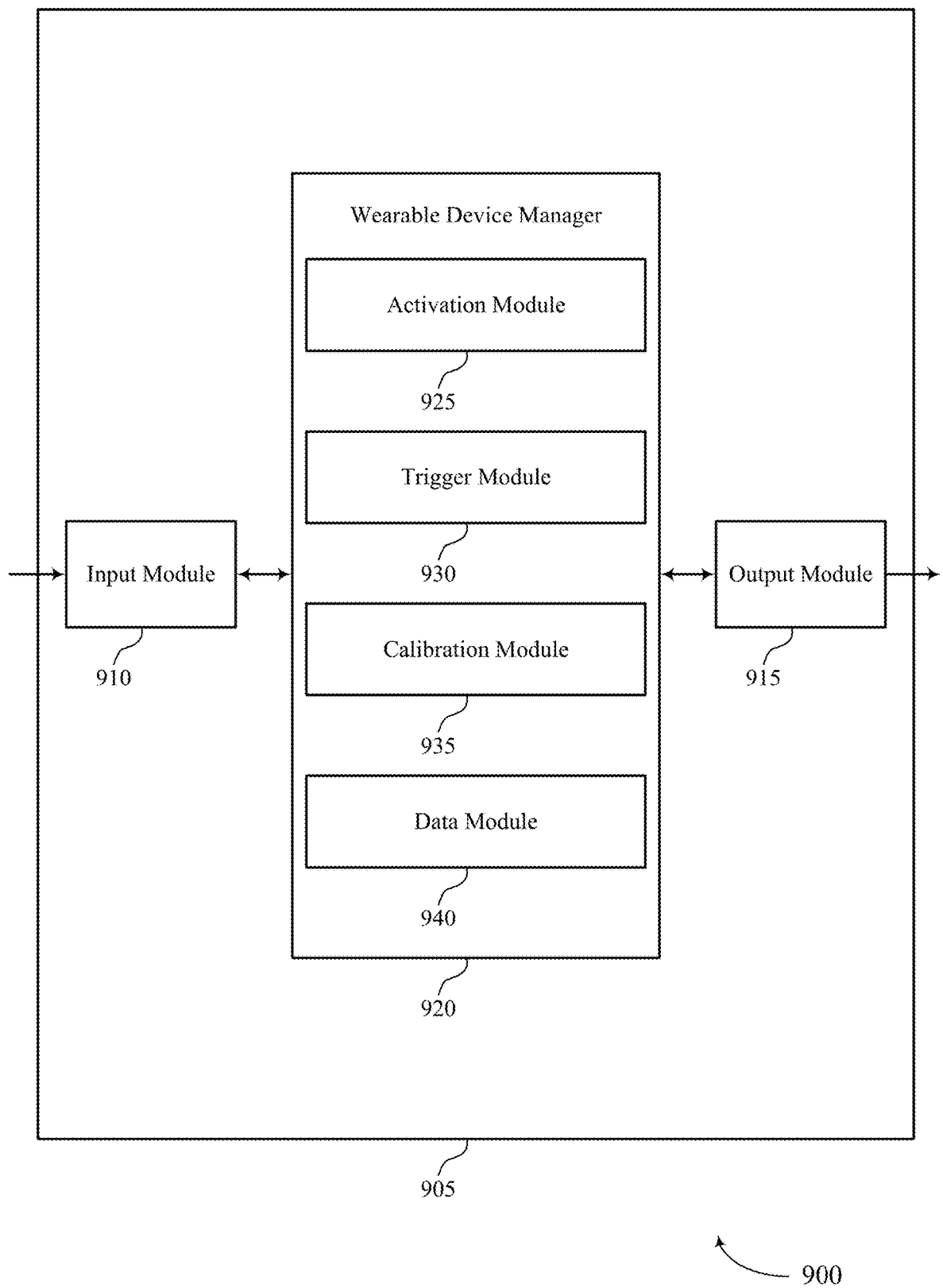
FIG. 9 shows a block diagram of an apparatus that supports techniques for temperature measurement according to a calibrated temperature in accordance with aspects of the present disclosure.

FIG. 9 shows a block diagram 900 of a device 905 that supports techniques for temperature measurement according to a calibrated temperature in accordance with aspects of the present disclosure. The device 905 may include an input module 910, an output module 915, and a wearable device manager 920. The device 905 may also include a processor. Each of these components may be in communication with one another (e.g., via one or more buses).

The input module 910 may provide a means for receiving information such as packets, user data, control information, or any combination thereof associated with various information channels (e.g., control channels, data channels, information channels related to temperature measurement according to a calibrated temperature). Information may be passed on to other components of the device 905. The input module 910 may utilize a single antenna or a set of multiple antennas The output module 915 may provide a means for transmitting signals generated by other components of the device 905. For example, the output module 915 may transmit information such as packets, user data, control information, or any combination thereof associated with various information channels (e.g., control channels, data channels, information channels related to temperature measurement according to a calibrated temperature). In some examples, the output module 915 may be co-located with the input module 910 in a transceiver module. The output module 915 may utilize a single antenna or a set of multiple antennas.

For example, the wearable device manager 920 may include an activation module 925, a trigger module 930, a calibration module 935, a data module 940, or any combination thereof. In some examples, the wearable device manager 920, or various components thereof, may be configured to perform various operations (e.g., receiving, monitoring, transmitting) using or otherwise in cooperation with the input module 910, the output module 915, or both. For example, the wearable device manager 920 may receive information from the input module 910, send information to the output module 915, or be integrated in combination with the input module 910, the output module 915, or both to receive information, transmit information, or perform various other operations as described herein.

The wearable device manager 920 may support temperature calibration in accordance with examples as disclosed herein. The activation module 925 may be configured as or otherwise support a means for activating a set of temperature sensors associated with the device 905 (e.g., a wearable device), the set of temperature sensors comprising a primary temperature sensor and one or more secondary temperature sensors. The trigger module 930 may be configured as or otherwise support a means for determining a trigger to calibrate the one or more secondary temperature sensors based at least in part on one or more conditions. The calibration module 935 may be configured as or otherwise support a means for calibrating the one or more secondary temperature sensors using the primary temperature sensor based at least in part on the trigger. The data module 940 may be configured as or otherwise support a means for processing temperature data associated with a user that is received from one or more of the primary temperature sensor or the one or more secondary temperature sensors based at least in part on the calibrating.

Figure 10:
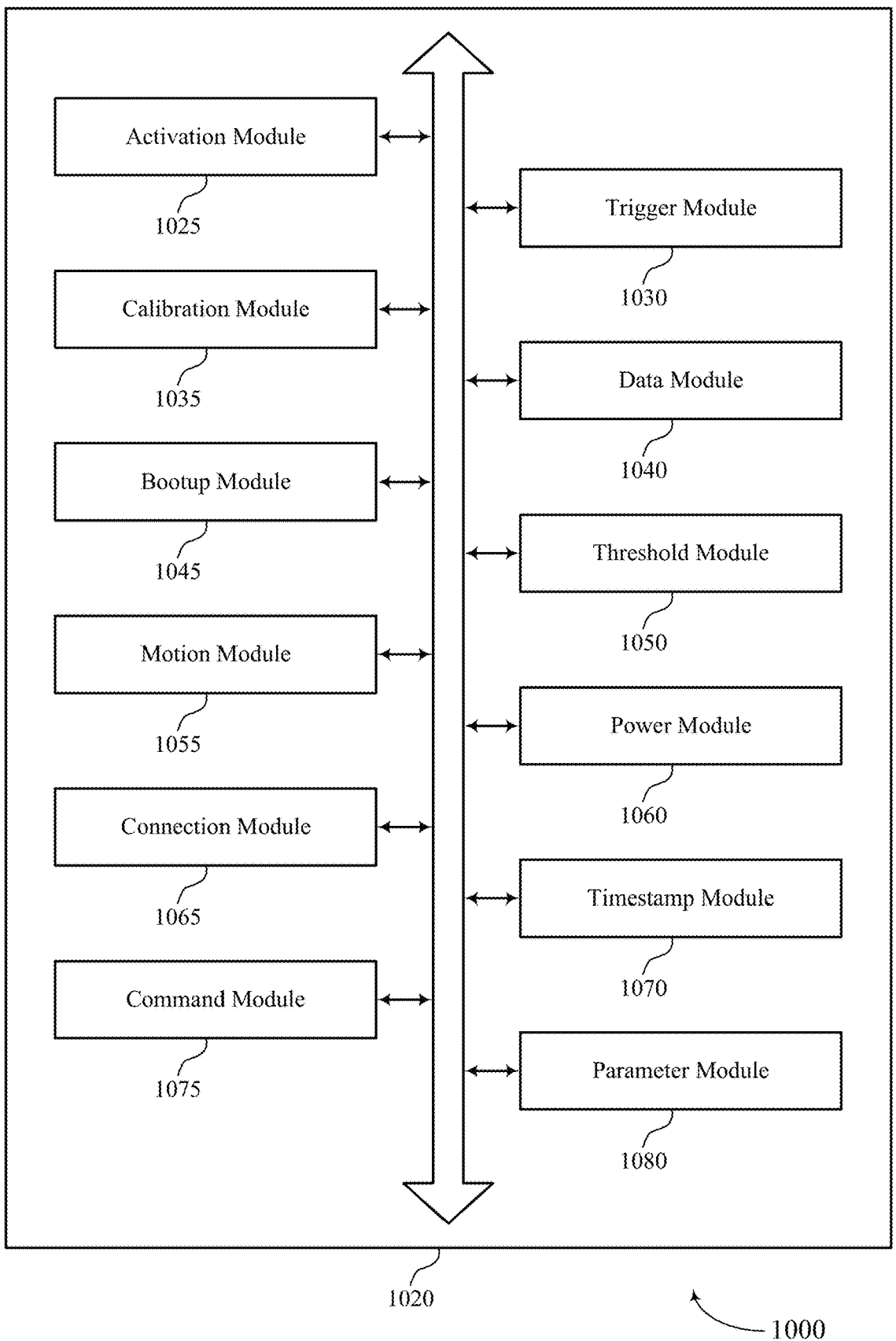
FIG. 10 shows a block diagram of a wearable device manager that supports techniques for temperature measurement according to a calibrated temperature in accordance with aspects of the present disclosure.

FIG. 10 shows a block diagram 1000 of a wearable device manager 1020 that supports techniques for temperature measurement according to a calibrated temperature in accordance with aspects of the present disclosure. The wearable device manager 1020 may be an example of aspects of a wearable device manager or a wearable device manager 920, or both, as described herein. The wearable device manager 1020, or various components thereof, may be an example of means for performing various aspects of techniques for temperature measurement according to a calibrated temperature as described herein. For example, the wearable device manager 1020 may include an activation module 1025, a trigger module 1030, a calibration module 1035, a data module 1040, a bootup module 1045, a threshold module 1050, a motion module 1055, a power module 1060, a connection module 1065, a timestamp module 1070, a command module 1075, a parameter module 1080, or any combination thereof. Each of these modules may communicate, directly or indirectly, with one another (e.g., via one or more buses).

The wearable device manager 1020 may support temperature calibration in accordance with examples as disclosed herein. The activation module 1025 may be configured as or otherwise support a means for activating a set of temperature sensors associated with a wearable device, the set of temperature sensors comprising a primary temperature sensor and one or more secondary temperature sensors. The trigger module 1030 may be configured as or otherwise support a means for determining a trigger to calibrate the one or more secondary temperature sensors based at least in part on one or more conditions. The calibration module 1035 may be configured as or otherwise support a means for calibrating the one or more secondary temperature sensors using the primary temperature sensor based at least in part on the trigger. The data module 1040 may be configured as or otherwise support a means for processing temperature data associated with a user that is received from one or more of the primary temperature sensor or the one or more secondary temperature sensors based at least in part on the calibrating.

In some examples, to support determining the trigger, the data module 1040 may be configured as or otherwise support a means for monitoring the temperature data associated with the user from one or more of the primary temperature sensor or the one or more secondary temperature sensors for a duration. In some examples, to support determining the trigger, the threshold module 1050 may be configured as or otherwise support a means for determining that the temperature data associated with the user from one or more of the primary temperature sensor or the one or more secondary temperature sensors satisfies a threshold for the duration. In some examples, to support determining the trigger, the calibration module 1035 may be configured as or otherwise support a means for calibrating the one or more secondary temperature sensors using the primary temperature sensor based at least in part on determining that the temperature data associated with the user from one or more of the primary temperature sensor or the one or more secondary temperature sensors satisfies the threshold for the duration.

In some examples, to support determining the trigger, the motion module 1055 may be configured as or otherwise support a means for monitoring accelerometer data from one or more accelerometer sensors associated with the wearable device for a duration. In some examples, to support determining the trigger, the motion module 1055 may be configured as or otherwise support a means for determining that accelerometer data from the one or more accelerometer sensors satisfies a threshold for the duration. In some examples, to support determining the trigger, the motion module 1055 may be configured as or otherwise support a means for determining an absence of motion associated with the user based at least in part on determining that the accelerometer data from the one or more accelerometer sensors satisfies the threshold for the duration, the accelerometer data indicating whether the wearable device is worn by the user. In some examples, to support determining the trigger, the calibration module 1035 may be configured as or otherwise support a means for calibrating the one or more secondary temperature sensors using the primary temperature sensor based at least in part on determining the absence of motion associated with the user.

In some examples, to support determining the trigger, the power module 1060 may be configured as or otherwise support a means for monitoring a power level associated with the wearable device. In some examples, to support determining the trigger, the power module 1060 may be configured as or otherwise support a means for determining that the power level associated with the wearable device satisfies a threshold. In some examples, to support determining the trigger, the calibration module 1035 may be configured as or otherwise support a means for calibrating the one or more secondary temperature sensors using the primary temperature sensor based at least in part on the power level associated with the wearable device satisfying the threshold. In some examples, to support determining the trigger, the connection module 1065 may be configured as or otherwise support a means for establishing a connection between the wearable device and a power charger associated with the wearable device. In some examples, to support determining the trigger, the calibration module 1035 may be configured as or otherwise support a means for calibrating the one or more secondary temperature sensors using the primary temperature sensor based at least in part on establishing the connection between the wearable device and the power charger associated with the wearable device.

In some examples, to support determining the trigger, the timestamp module 1070 may be configured as or otherwise support a means for determining a timestamp associated with a previous calibration of the one or more secondary temperature sensors. In some examples, to support determining the trigger, the timestamp module 1070 may be configured as or otherwise support a means for determining that an elapsed duration from the timestamp associated with the previous calibration satisfies a threshold. In some examples, to support determining the trigger, the calibration module 1035 may be configured as or otherwise support a means for calibrating the one or more secondary temperature sensors using the primary temperature sensor based at least in part on the elapsed duration from the timestamp associated with the previous calibration satisfying the threshold.

In some examples, to support determining the trigger, the command module 1075 may be configured as or otherwise support a means for receiving a user command from one or more of the wearable device or a remote device in communication with the wearable device to enable the temperature calibration. In some examples, to support determining the trigger, the calibration module 1035 may be configured as or otherwise support a means for calibrating the one or more secondary temperature sensors using the primary temperature sensor based at least in part on the user command from one or more of the wearable device or the remote device in communication with the wearable device.

In some examples, to support determining the trigger, the bootup module 1045 may be configured as or otherwise support a means for determining a booting operation associated with the wearable device. In some examples, to support determining the trigger, the calibration module 1035 may be configured as or otherwise support a means for calibrating the one or more secondary temperature sensors using the primary temperature sensor based at least in part on the booting operation associated with the wearable device. In some examples, to support calibrating the one or more secondary temperature sensors, the parameter module 1080 may be configured as or otherwise support a means for adjusting a respective parameter associated with each secondary temperature sensor of the one or more secondary temperature sensors based at least in part on a respective parameter associated with the primary temperature sensor and one or more of sampled temperature data from each secondary temperature sensor of the one or more secondary temperature sensors. In some examples, the respective parameter associated with each secondary temperature sensor of the one or more secondary temperature sensors comprises one or more of a temperature measurement range, an accuracy temperature measurement range, or a temperature measurement sampling interval.

In some examples, to support calibrating the one or more secondary temperature sensors, the data module 1040 may be configured as or otherwise support a means for mapping sampled temperature data from each secondary temperature sensor of the one or more secondary temperature sensors to a temperature-resistance model. In some examples, to support calibrating the one or more secondary temperature sensors, the parameter module 1080 may be configured as or otherwise support a means for adjusting a respective parameter associated with each secondary temperature sensor of the one or more secondary temperature sensors based at least in part on a respective parameter associated with the primary temperature sensor and mapping the sampled temperature data from each secondary temperature sensor of the one or more secondary temperature sensors to the temperature-resistance model.

In some examples, the calibration module 1035 may be configured as or otherwise support a means for determining to calibrate the one or more secondary temperature sensors separately or jointly based at least in part on a manufacturing configuration of the wearable device or a user enabled configuration of the wearable device. In some examples, the calibration module 1035 may be configured as or otherwise support a means for calibrating the one or more secondary temperature sensors based at least in part on determining to calibrate the one or more secondary temperature sensors separately or jointly.

In some examples, the data module 1040 may be configured as or otherwise support a means for transmitting the temperature data associated with the user from the wearable device to a remote device in communication with the wearable device to output a representation of the temperature data via a graphical user interface of the remote device. In some examples, the wearable device comprises a wearable ring device. In some examples, the primary temperature sensor comprises a calibrated temperature sensor and the one or more secondary temperature sensors comprise uncalibrated temperature sensors prior to the calibrating, and one or more of the primary temperature sensor or the one or more secondary temperature sensors comprise a negative temperature coefficient thermistor.

Figure 11:
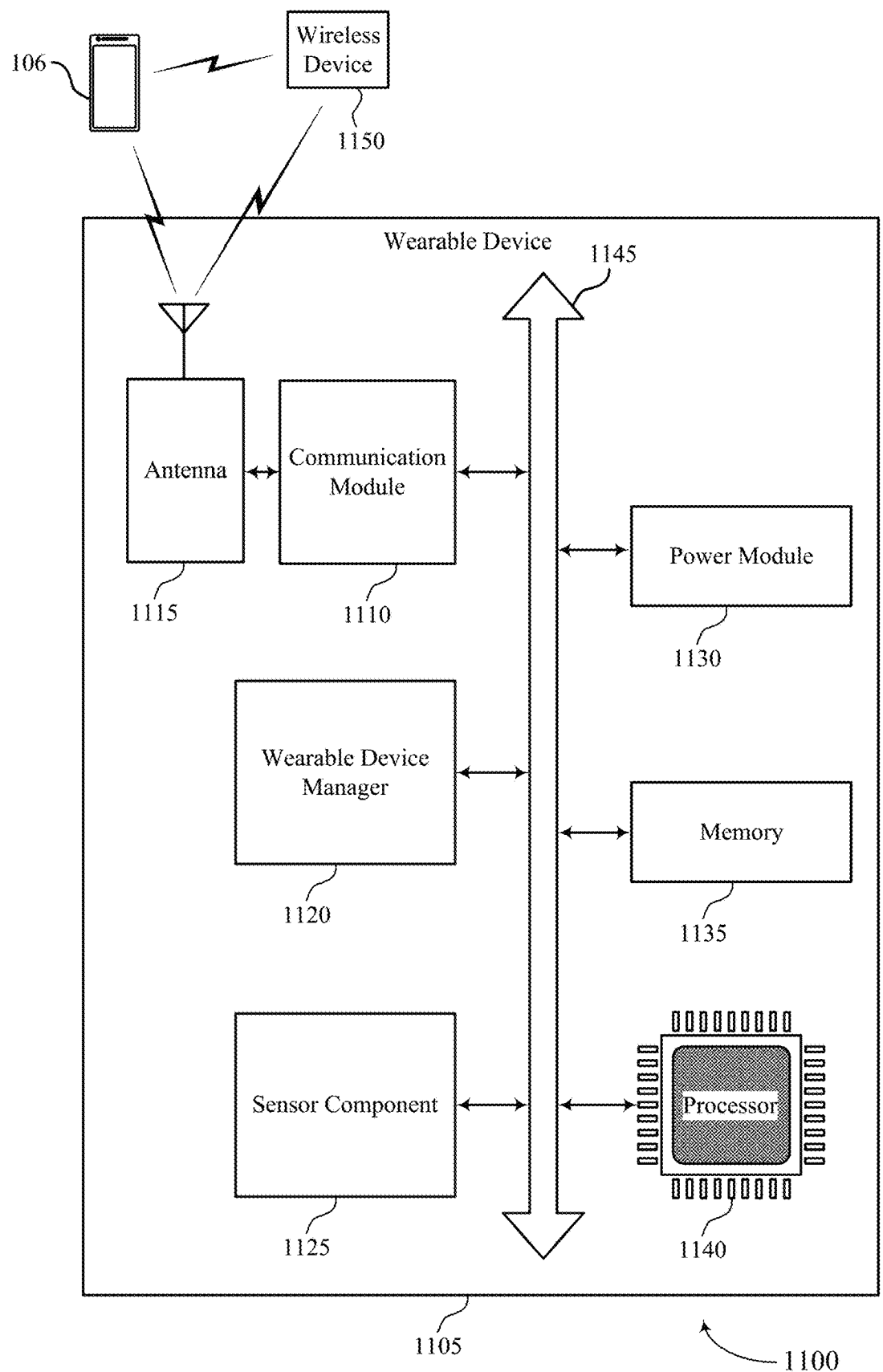
FIG. 11 shows a diagram of a system including a device that supports techniques for temperature measurement according to a calibrated temperature in accordance with aspects of the present disclosure.

FIG. 11 shows a diagram of a system 1100 including a device 1105 that supports techniques for temperature measurement according to a calibrated temperature in accordance with aspects of the present disclosure. The device 1105 may be an example of or include the components of a device 905 as described herein. The device 1105 may include components for bi-directional voice and data communications including components for transmitting and receiving communications, such as a wearable device manager 1120, a communication module 1110, an antenna 1115, a sensor component 1125, a power module 1130, a memory 1135, a processor 1140, and a wireless device 1150. These components may be in electronic communication or otherwise coupled (e.g., operatively, communicatively, functionally, electronically, electrically) via one or more buses (e.g., a bus 1145).

The wearable device manager 1120 may support temperature calibration in accordance with examples as disclosed herein. For example, the wearable device manager 1120 may be configured as or otherwise support a means for activating a set of temperature sensors associated with the device 1105 (e.g., a wearable device), the set of temperature sensors comprising a primary temperature sensor and one or more secondary temperature sensors. The wearable device manager 1120 may be configured as or otherwise support a means for determining a trigger to calibrate the one or more secondary temperature sensors based at least in part on one or more conditions. The wearable device manager 1120 may be configured as or otherwise support a means for calibrating the one or more secondary temperature sensors using the primary temperature sensor based at least in part on the trigger. The wearable device manager 1120 may be configured as or otherwise support a means for processing temperature data associated with a user that is received from one or more of the primary temperature sensor or the one or more secondary temperature sensors based at least in part on the calibrating. By including or configuring the wearable device manager 1120 in accordance with examples as described herein, the device 1105 may support techniques for longer battery life by efficiently supporting calibration of temperature sensors.

Figure 12:
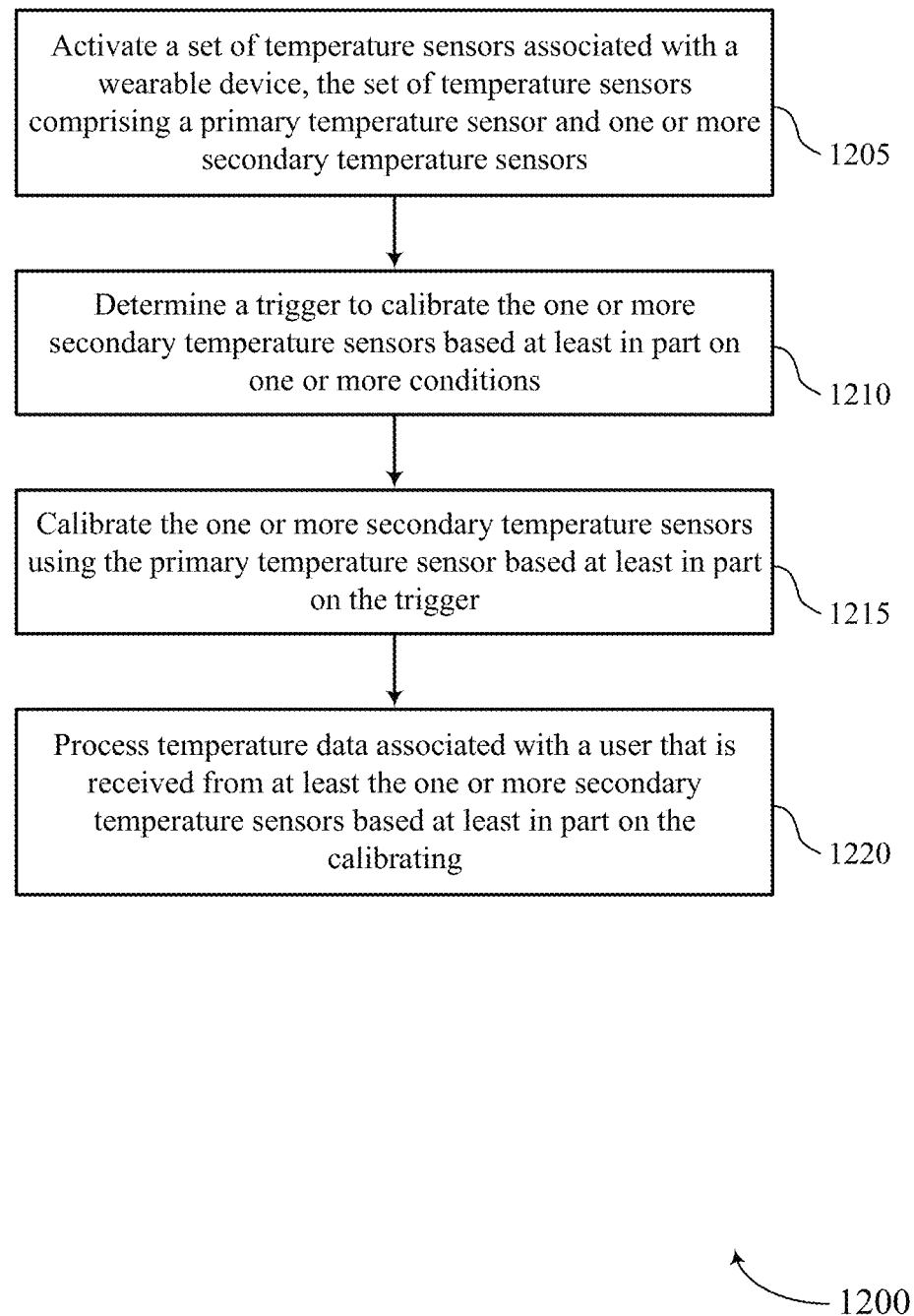
FIGS. 12 through 15 show flowcharts illustrating methods that support techniques for temperature measurement according to a calibrated temperature in accordance with aspects of the present disclosure.

FIG. 12 shows a flowchart illustrating a method 1200 that supports techniques for temperature measurement according to a calibrated temperature in accordance with aspects of the present disclosure. The operations of the method 1200 may be implemented by a wearable device or its components as described herein. For example, the operations of the method 1200 may be performed by a wearable device as described with reference to FIGS. 1 through 11. In some examples, a wearable device may execute a set of instructions to control the functional elements of the wearable device to perform the described functions. Additionally, or alternatively, the wearable device may perform aspects of the described functions using special-purpose hardware.

At 1205, the method may include activating a set of temperature sensors associated with a wearable device, the set of temperature sensors comprising a primary temperature sensor and one or more secondary temperature sensors. The operations of 1205 may be performed in accordance with examples as disclosed herein. In some examples, aspects of the operations of 1205 may be performed by an activation module 1025 as described with reference to FIG. 10.

At 1210, the method may include determining a trigger to calibrate the one or more secondary temperature sensors based at least in part on one or more conditions. The operations of 1210 may be performed in accordance with examples as disclosed herein. In some examples, aspects of the operations of 1210 may be performed by a trigger module 1030 as described with reference to FIG. 10.

At 1215, the method may include calibrating the one or more secondary temperature sensors using the primary temperature sensor based at least in part on the trigger. The operations of 1215 may be performed in accordance with examples as disclosed herein. In some examples, aspects of the operations of 1215 may be performed by a calibration module 1035 as described with reference to FIG. 10.

At 1220, the method may include processing temperature data associated with a user that is received from at least the one or more secondary temperature sensors based at least in part on the calibrating. The operations of 1220 may be performed in accordance with examples as disclosed herein. In some examples, aspects of the operations of 1220 may be performed by a data module 1040 as described with reference to FIG. 10.

Figure 13:
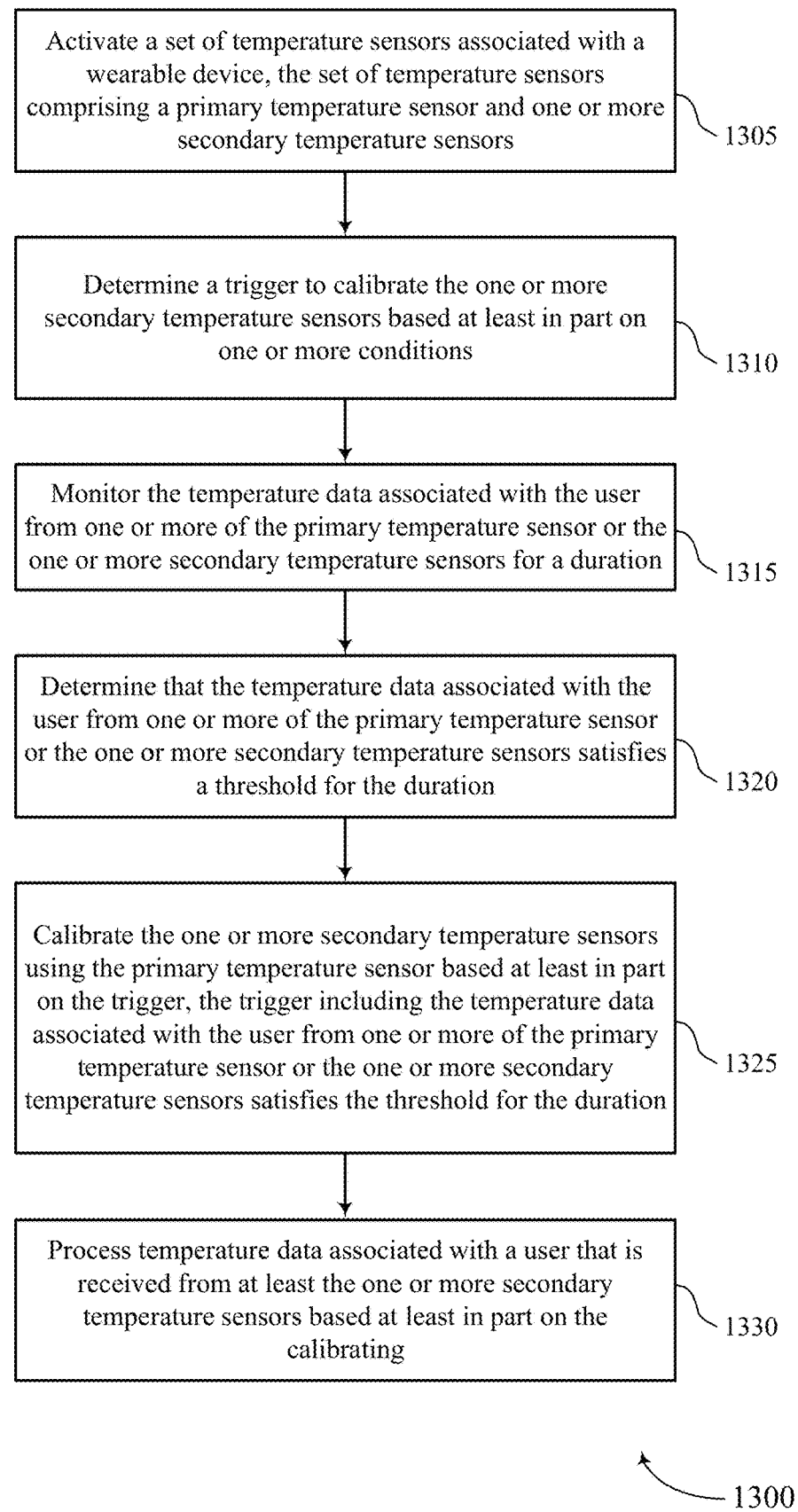

FIG. 13 shows a flowchart illustrating a method 1300 that supports techniques for temperature measurement according to a calibrated temperature in accordance with aspects of the present disclosure. The operations of the method 1300 may be implemented by a wearable device or its components as described herein. For example, the operations of the method 1300 may be performed by a wearable device as described with reference to FIGS. 1 through 11. In some examples, a wearable device may execute a set of instructions to control the functional elements of the wearable device to perform the described functions. Additionally, or alternatively, the wearable device may perform aspects of the described functions using special-purpose hardware.

At 1305, the method may include activating a set of temperature sensors associated with a wearable device, the set of temperature sensors comprising a primary temperature sensor and one or more secondary temperature sensors. The operations of 1305 may be performed in accordance with examples as disclosed herein. In some examples, aspects of the operations of 1305 may be performed by an activation module 1025 as described with reference to FIG. 10.

At 1310, the method may include determining a trigger to calibrate the one or more secondary temperature sensors based at least in part on one or more conditions. The operations of 1310 may be performed in accordance with examples as disclosed herein. In some examples, aspects of the operations of 1310 may be performed by a trigger module 1030 as described with reference to FIG. 10.

At 1315, the method may include monitoring the temperature data associated with the user from one or more of the primary temperature sensor or the one or more secondary temperature sensors for a duration. The operations of 1315 may be performed in accordance with examples as disclosed herein. In some examples, aspects of the operations of 1315 may be performed by a data module 1040 as described with reference to FIG. 10.

At 1320, the method may include determining that the temperature data associated with the user from one or more of the primary temperature sensor or the one or more secondary temperature sensors satisfies a threshold for the duration. The operations of 1320 may be performed in accordance with examples as disclosed herein. In some examples, aspects of the operations of 1320 may be performed by a threshold module 1050 as described with reference to FIG. 10.

At 1325, the method may include calibrating the one or more secondary temperature sensors using the primary temperature sensor based at least in part on the trigger, the trigger including the temperature data associated with the user from one or more of the primary temperature sensor or the one or more secondary temperature sensors satisfies the threshold for the duration. The operations of 1325 may be performed in accordance with examples as disclosed herein. In some examples, aspects of the operations of 1325 may be performed by a calibration module 1035 as described with reference to FIG. 10.

At 1330, the method may include processing temperature data associated with a user that is received from at least the one or more secondary temperature sensors based at least in part on the calibrating. The operations of 1330 may be performed in accordance with examples as disclosed herein. In some examples, aspects of the operations of 1330 may be performed by a data module 1040 as described with reference to FIG. 10.

Figure 14:
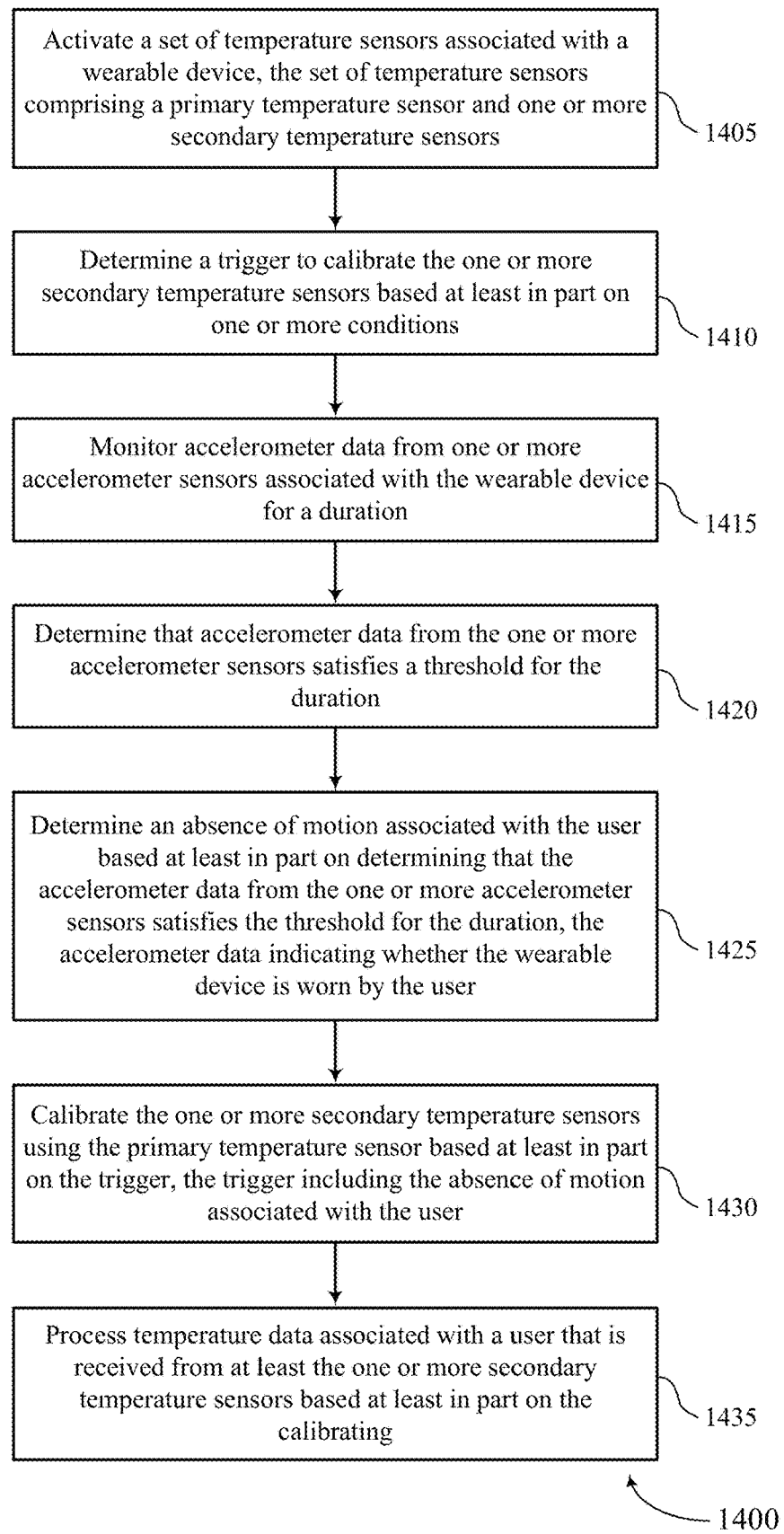

FIG. 14 shows a flowchart illustrating a method 1400 that supports techniques for temperature measurement according to a calibrated temperature in accordance with aspects of the present disclosure. The operations of the method 1400 may be implemented by a wearable device or its components as described herein. For example, the operations of the method 1400 may be performed by a wearable device as described with reference to FIGS. 1 through 11. In some examples, a wearable device may execute a set of instructions to control the functional elements of the wearable device to perform the described functions. Additionally, or alternatively, the wearable device may perform aspects of the described functions using special-purpose hardware.

At 1405, the method may include activating a set of temperature sensors associated with a wearable device, the set of temperature sensors comprising a primary temperature sensor and one or more secondary temperature sensors. The operations of 1405 may be performed in accordance with examples as disclosed herein. In some examples, aspects of the operations of 1405 may be performed by an activation module 1025 as described with reference to FIG. 10.

At 1410, the method may include determining a trigger to calibrate the one or more secondary temperature sensors based at least in part on one or more conditions. The operations of 1410 may be performed in accordance with examples as disclosed herein. In some examples, aspects of the operations of 1410 may be performed by a trigger module 1030 as described with reference to FIG. 10.

At 1415, the method may include monitoring accelerometer data from one or more accelerometer sensors associated with the wearable device for a duration. The operations of 1415 may be performed in accordance with examples as disclosed herein. In some examples, aspects of the operations of 1415 may be performed by a motion module 1055 as described with reference to FIG. 10.

At 1420, the method may include determining that accelerometer data from the one or more accelerometer sensors satisfies a threshold for the duration. The operations of 1420 may be performed in accordance with examples as disclosed herein. In some examples, aspects of the operations of 1420 may be performed by a motion module 1055 as described with reference to FIG. 10.

At 1425, the method may include determining an absence of motion associated with the user based at least in part on determining that the accelerometer data from the one or more accelerometer sensors satisfies the threshold for the duration, the accelerometer data indicating whether the wearable device is worn by the user. The operations of 1425 may be performed in accordance with examples as disclosed herein. In some examples, aspects of the operations of 1425 may be performed by a motion module 1055 as described with reference to FIG. 10.

At 1430, the method may include calibrating the one or more secondary temperature sensors using the primary temperature sensor based at least in part on the trigger, the trigger including the absence of motion associated with the user. The operations of 1430 may be performed in accordance with examples as disclosed herein. In some examples, aspects of the operations of 1430 may be performed by a calibration module 1035 as described with reference to FIG. 10.

At 1435, the method may include processing temperature data associated with a user that is received from at least the one or more secondary temperature sensors based at least in part on the calibrating. The operations of 1435 may be performed in accordance with examples as disclosed herein. In some examples, aspects of the operations of 1435 may be performed by a data module 1040 as described with reference to FIG. 10.

Figure 15:
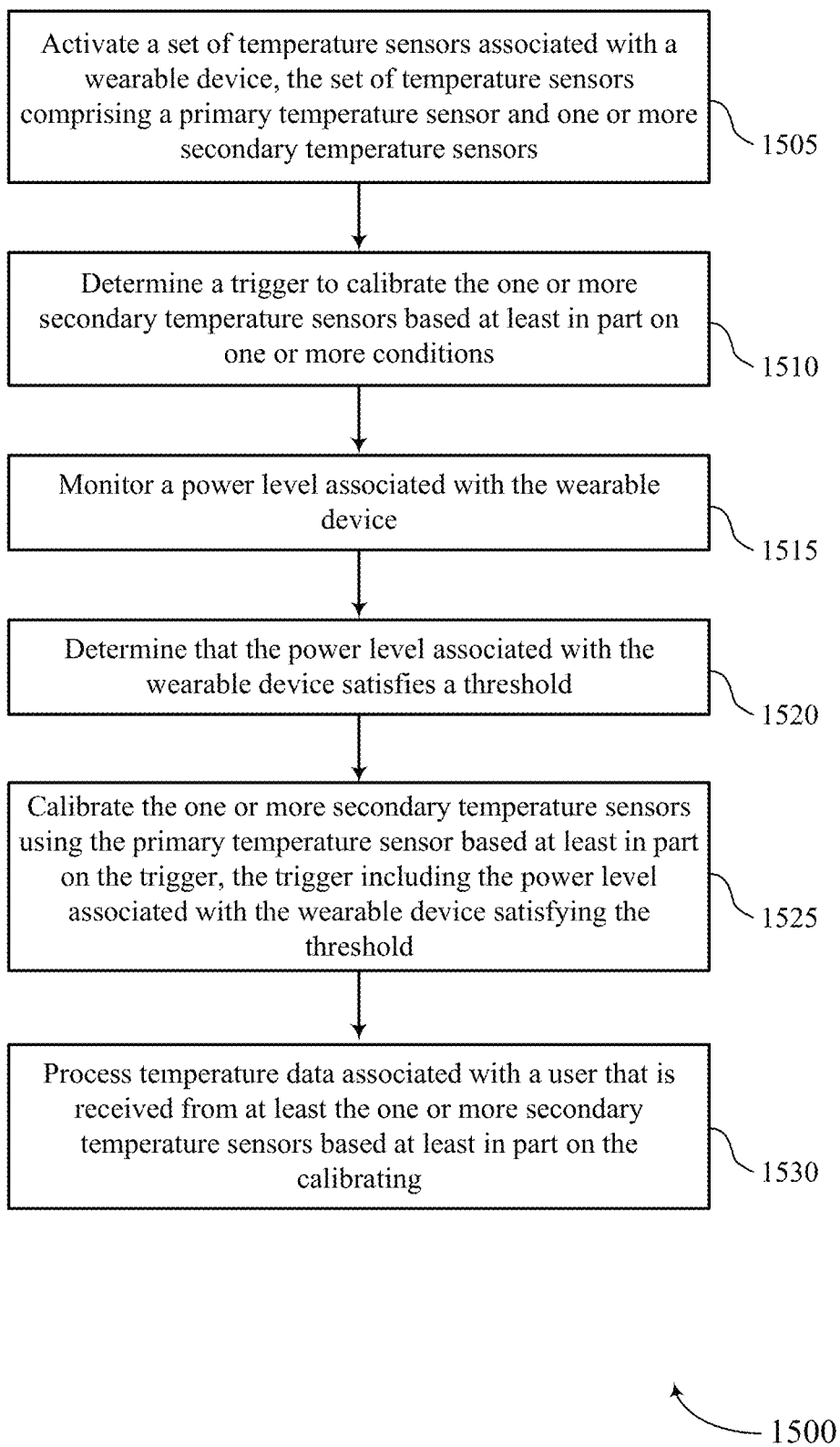

FIG. 15 shows a flowchart illustrating a method 1500 that supports techniques for temperature measurement according to a calibrated temperature in accordance with aspects of the present disclosure. The operations of the method 1500 may be implemented by a wearable device or its components as described herein. For example, the operations of the method 1500 may be performed by a wearable device as described with reference to FIGS. 1 through 11. In some examples, a wearable device may execute a set of instructions to control the functional elements of the wearable device to perform the described functions. Additionally, or alternatively, the wearable device may perform aspects of the described functions using special-purpose hardware.

At 1505, the method may include activating a set of temperature sensors associated with a wearable device, the set of temperature sensors comprising a primary temperature sensor and one or more secondary temperature sensors. The operations of 1505 may be performed in accordance with examples as disclosed herein. In some examples, aspects of the operations of 1505 may be performed by an activation module 1025 as described with reference to FIG. 10.

At 1510, the method may include determining a trigger to calibrate the one or more secondary temperature sensors based at least in part on one or more conditions. The operations of 1510 may be performed in accordance with examples as disclosed herein. In some examples, aspects of the operations of 1510 may be performed by a trigger module 1030 as described with reference to FIG. 10.

At 1515, the method may include monitoring a power level associated with the wearable device. The operations of 1515 may be performed in accordance with examples as disclosed herein. In some examples, aspects of the operations of 1515 may be performed by a power module 1060 as described with reference to FIG. 10.

At 1520, the method may include determining that the power level associated with the wearable device satisfies a threshold. The operations of 1520 may be performed in accordance with examples as disclosed herein. In some examples, aspects of the operations of 1520 may be performed by a power module 1060 as described with reference to FIG. 10.

At 1525, the method may include calibrating the one or more secondary temperature sensors using the primary temperature sensor based at least in part on the trigger, the trigger including the power level associated with the wearable device satisfying the threshold. The operations of 1525 may be performed in accordance with examples as disclosed herein. In some examples, aspects of the operations of 1525 may be performed by a calibration module 1035 as described with reference to FIG. 10.

At 1530, the method may include processing temperature data associated with a user that is received from at least the one or more secondary temperature sensors based at least in part on the calibrating. The operations of 1530 may be performed in accordance with examples as disclosed herein. In some examples, aspects of the operations of 1530 may be performed by a data module 1040 as described with reference to FIG. 10.

It should be noted that the methods described above describe possible implementations, and that the operations and the steps may be rearranged or otherwise modified and that other implementations are possible. Furthermore, aspects from two or more of the methods may be combined.

A method for temperature calibration is described. The method may include activating a set of temperature sensors associated with a wearable device, the set of temperature sensors comprising a primary temperature sensor and one or more secondary temperature sensors, determining a trigger to calibrate the one or more secondary temperature sensors based at least in part on one or more conditions, calibrating the one or more secondary temperature sensors using the primary temperature sensor based at least in part on the trigger, and processing temperature data associated with a user that is received from at least the one or more secondary temperature sensors based at least in part on the calibrating.

An apparatus for temperature calibration is described. The apparatus may include a processor, memory coupled with the processor, a plurality of temperature sensors coupled with the processor and the memory, the plurality of temperature sensors comprising a primary temperature sensor and one or more secondary temperature sensors, and instructions stored in the memory. The instructions may be executable by the processor to cause the apparatus to activate a set of temperature sensors associated with a wearable device, the set of temperature sensors comprising a primary temperature sensor and one or more secondary temperature sensors, determine a trigger to calibrate the one or more secondary temperature sensors based at least in part on one or more conditions, calibrate the one or more secondary temperature sensors using the primary temperature sensor based at least in part on the trigger, and process temperature data associated with a user that is received from at least the one or more secondary temperature sensors based at least in part on the calibrating.

Another apparatus for temperature calibration is described. The apparatus may include means for activating a set of temperature sensors associated with a wearable device, the set of temperature sensors comprising a primary temperature sensor and one or more secondary temperature sensors, means for determining a trigger to calibrate the one or more secondary temperature sensors based at least in part on one or more conditions, means for calibrating the one or more secondary temperature sensors using the primary temperature sensor based at least in part on the trigger, and means for processing temperature data associated with a user that is received from at least the one or more secondary temperature sensors based at least in part on the calibrating.

A non-transitory computer-readable medium storing code for temperature calibration is described. The code may include instructions executable by a processor to activate a set of temperature sensors associated with a wearable device, the set of temperature sensors comprising a primary temperature sensor and one or more secondary temperature sensors, determine a trigger to calibrate the one or more secondary temperature sensors based at least in part on one or more conditions, calibrate the one or more secondary temperature sensors using the primary temperature sensor based at least in part on the trigger, and process temperature data associated with a user that is received from at least the one or more secondary temperature sensors based at least in part on the calibrating.

In some examples of the method, apparatuses, and non-transitory computer-readable medium described herein, determining the trigger may include operations, features, means, or instructions for monitoring the temperature data associated with the user from one or more of the primary temperature sensor or the one or more secondary temperature sensors for a duration, determining that the temperature data associated with the user from one or more of the primary temperature sensor or the one or more secondary temperature sensors satisfies a threshold for the duration, and wherein calibrating the one or more secondary temperature sensors using the primary temperature sensor may be based at least in part on determining that the temperature data associated with the user from one or more of the primary temperature sensor or the one or more secondary temperature sensors satisfies the threshold for the duration.

In some examples of the method, apparatuses, and non-transitory computer-readable medium described herein, determining the trigger may include operations, features, means, or instructions for monitoring accelerometer data from one or more accelerometer sensors associated with the wearable device for a duration, determining that accelerometer data from the one or more accelerometer sensors satisfies a threshold for the duration, determining an absence of motion associated with the user based at least in part on determining that the accelerometer data from the one or more accelerometer sensors satisfies the threshold for the duration, the accelerometer data indicating whether the wearable device may be worn by the user, and wherein calibrating the one or more secondary temperature sensors using the primary temperature sensor may be based at least in part on determining the absence of motion associated with the user.

In some examples of the method, apparatuses, and non-transitory computer-readable medium described herein, determining the trigger may include operations, features, means, or instructions for monitoring a power level associated with the wearable device, determining that the power level associated with the wearable device satisfies a threshold, and wherein calibrating the one or more secondary temperature sensors using the primary temperature sensor may be based at least in part on the power level associated with the wearable device satisfying the threshold.

In some examples of the method, apparatuses, and non-transitory computer-readable medium described herein, determining the trigger may include operations, features, means, or instructions for establishing a connection between the wearable device and a power charger associated with the wearable device and wherein calibrating the one or more secondary temperature sensors using the primary temperature sensor may be based at least in part on establishing the connection between the wearable device and the power charger associated with the wearable device.

In some examples of the method, apparatuses, and non-transitory computer-readable medium described herein, determining the trigger may include operations, features, means, or instructions for determining a timestamp associated with a previous calibration of the one or more secondary temperature sensors, determining that an elapsed duration from the timestamp associated with the previous calibration satisfies a threshold, and wherein calibrating the one or more secondary temperature sensors using the primary temperature sensor may be based at least in part on the elapsed duration from the timestamp associated with the previous calibration satisfying the threshold.

In some examples of the method, apparatuses, and non-transitory computer-readable medium described herein, determining the trigger may include operations, features, means, or instructions for receiving a user command from one or more of the wearable device or a remote device in communication with the wearable device to enable the temperature calibration and wherein calibrating the one or more secondary temperature sensors using the primary temperature sensor may be based at least in part on the user command from one or more of the wearable device or the remote device in communication with the wearable device.

Some examples of the method, apparatuses, and non-transitory computer-readable medium described herein may further include operations, features, means, or instructions for determining a booting operation associated with the wearable device and wherein calibrating the one or more secondary temperature sensors using the primary temperature sensor may be based at least in part on the booting operation associated with the wearable device.

In some examples of the method, apparatuses, and non-transitory computer-readable medium described herein, calibrating the one or more secondary temperature sensors may include operations, features, means, or instructions for adjusting a respective parameter associated with each secondary temperature sensor of the one or more secondary temperature sensors based at least in part on a respective parameter associated with the primary temperature sensor and one or more of sampled temperature data from each secondary temperature sensor of the one or more secondary temperature sensors and wherein the respective parameter associated with each secondary temperature sensor of the one or more secondary temperature sensors comprises one or more of a temperature measurement range, an accuracy temperature measurement range, or a temperature measurement sampling interval.

In some examples of the method, apparatuses, and non-transitory computer-readable medium described herein, calibrating the one or more secondary temperature sensors may include operations, features, means, or instructions for mapping sampled temperature data from each secondary temperature sensor of the one or more secondary temperature sensors to a temperature-resistance model and adjusting a respective parameter associated with each secondary temperature sensor of the one or more secondary temperature sensors based at least in part on a respective parameter associated with the primary temperature sensor and mapping the sampled temperature data from each secondary temperature sensor of the one or more secondary temperature sensors to the temperature-resistance model.

Some examples of the method, apparatuses, and non-transitory computer-readable medium described herein may further include operations, features, means, or instructions for determining to calibrate the one or more secondary temperature sensors separately or jointly based at least in part on a manufacturing configuration of the wearable device or a user enabled configuration of the wearable device and wherein calibrating the one or more secondary temperature sensors may be based at least in part on determining to calibrate the one or more secondary temperature sensors separately or jointly.

Some examples of the method, apparatuses, and non-transitory computer-readable medium described herein may further include operations, features, means, or instructions for transmitting the temperature data associated with the user from the wearable device to a remote device in communication with the wearable device to output a representation of the temperature data via a graphical user interface of the remote device.

In some examples of the method, apparatuses, and non-transitory computer-readable medium described herein, the wearable device comprises a wearable ring device.

In some examples of the method, apparatuses, and non-transitory computer-readable medium described herein, the primary temperature sensor comprises a calibrated temperature sensor and the one or more secondary temperature sensors comprise uncalibrated temperature sensors prior to the calibrating, and one or more of the primary temperature sensor or the one or more secondary temperature sensors comprise a negative temperature coefficient thermistor.

In some examples of the method, apparatuses, and non-transitory computer-readable medium described herein, the temperature data is received from the one or more temperature sensors and the primary temperature sensor.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable ROM (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for temperature calibration by a wearable device comprising at least a primary temperature sensor and a plurality of secondary temperature sensors, comprising:
    determining, using one or more processors of the wearable device, a trigger to calibrate the plurality of secondary temperature sensors of the wearable device based at least in part on one or more conditions;
    activating, using the one or more processors, the primary temperature sensor and the plurality of secondary temperature sensors based at least in part on the trigger, wherein the primary temperature sensor is positioned within or beneath a surface of the wearable device in a first position to collect skin temperature data from a first location of a tissue of a user, and wherein each secondary temperature sensors of the plurality of secondary temperature sensors are positioned within or beneath the surface of the wearable device in at least a respective second position to collect skin temperature data from a respective second location of the tissue of the user;
    acquiring first skin temperature data from the first location of the tissue of the user via the primary temperature sensor, and second skin temperature data from the respective second locations of the tissue of the user via the plurality of secondary temperature sensors, based at least in part on activating the primary temperature sensor and the plurality of secondary temperature sensors;
    calibrating, in response to the trigger and using the one or more processors, the plurality of secondary temperature sensors using the primary temperature sensor, the first skin temperature data, and the second skin temperature data, wherein calibrating the plurality of secondary temperature sensors comprises adjusting a respective temperature measurement sampling interval of each secondary temperature sensor of the plurality of secondary temperature sensors;
    acquiring additional skin temperature data from the user via at least the plurality of secondary temperature sensors in accordance with the adjusted temperature measurement sampling intervals based at least in part on calibrating the plurality of secondary temperature sensors;
    determining a plurality of sleep stages of the user based at least in part on the additional skin temperature data, the plurality of sleep stages comprising one or more of an awake sleep stage, a rapid eye movement sleep stage, a light sleep stage, and a deep sleep stage; and
    displaying, via a graphical user interface of a user device associated with the wearable device, an indication of the plurality of sleep stages of the user.

2. The method of claim 1, wherein determining the trigger comprises:
    determining that the first skin temperature data, the second skin temperature data, or both, satisfies a threshold for a duration, wherein calibrating the plurality of secondary temperature sensors using the primary temperature sensor is based at least in part on determining that the first skin temperature data, the second skin temperature data, or both, satisfies the threshold for the duration.

3. The method of claim 1, wherein determining the trigger comprises:
    monitoring accelerometer data from one or more accelerometer sensors associated with the wearable device for a duration;
    determining that accelerometer data from the one or more accelerometer sensors satisfies a threshold for the duration; and
    determining an absence of motion associated with the user based at least in part on determining that the accelerometer data from the one or more accelerometer sensors satisfies the threshold for the duration, the accelerometer data indicating whether the wearable device is worn by the user, wherein calibrating the plurality of secondary temperature sensors using the primary temperature sensor is based at least in part on determining the absence of motion associated with the user.

4. The method of claim 1, wherein determining the trigger comprises:
    monitoring a power level associated with the wearable device; and
    determining that the power level associated with the wearable device satisfies a threshold, wherein calibrating the plurality of secondary temperature sensors using the primary temperature sensor is based at least in part on the power level associated with the wearable device satisfying the threshold.

5. The method of claim 1, wherein determining the trigger comprises:
    establishing a connection between the wearable device and a power charger associated with the wearable device, wherein calibrating the plurality of secondary temperature sensors using the primary temperature sensor is based at least in part on establishing the connection between the wearable device and the power charger associated with the wearable device.

6. The method of claim 1, wherein determining the trigger comprises:
determining a timestamp associated with a previous calibration of the plurality of secondary temperature sensors; and
determining that an elapsed duration from the timestamp associated with the previous calibration satisfies a threshold, wherein calibrating the plurality of secondary temperature sensors using the primary temperature sensor is based at least in part on the elapsed duration from the timestamp associated with the previous calibration satisfying the threshold.

7. The method of claim 1, wherein determining the trigger comprises:
receiving a user command from the wearable device, a remote device in communication with the wearable device, or both, to enable the temperature calibration, wherein calibrating the plurality of secondary temperature sensors using the primary temperature sensor is based at least in part on receiving the user command.

8. The method of claim 1, wherein determining the trigger comprise:
determining a booting operation associated with the wearable device, wherein calibrating the plurality of secondary temperature sensors using the primary temperature sensor is based at least in part on the booting operation associated with the wearable device.

9. The method of claim 1, wherein calibrating the plurality of secondary temperature sensors comprises:
mapping the second skin temperature data acquired via the plurality of secondary temperature sensors to a temperature-resistance model; and
adjusting a respective parameter associated with each secondary temperature sensor of the plurality of secondary temperature sensors based at least in part on a respective parameter associated with the primary temperature sensor, and based at least in part on mapping the second skin temperature data to the temperature-resistance model.

10. The method of claim 1, further comprising:
determining to calibrate the plurality of secondary temperature sensors separately based at least in part on a manufacturing configuration of the wearable device or a user enabled configuration of the wearable device, wherein calibrating the plurality of secondary temperature sensors is based at least in part on determining to calibrate the plurality of secondary temperature sensors separately.

11. The method of claim 1, wherein calibrating the plurality of secondary temperature sensors comprises:
updating a formula, an equation, or both, that correlate the second skin temperature data acquired via the plurality of secondary temperature sensors with the first skin temperature data acquired via the primary temperature sensor based at least in part on a comparison between the first skin temperature data and the second skin temperature data, wherein the additional skin temperature data acquired via the plurality of secondary temperature sensors is processed based at least in part on the updated formula, the updated equation, or both.

12. The method of claim 1, wherein the wearable device comprises a wearable ring device, wherein the primary temperature sensor is located at a first radial position along an inner curved surface of the wearable ring device, and wherein the plurality of secondary temperature sensors are located at a second radial position along the inner curved surface of the wearable ring device.

13. The method of claim 1, wherein the primary temperature sensor comprises a calibrated temperature sensor and the plurality of secondary temperature sensors comprise uncalibrated temperature sensors prior to the calibrating, wherein the primary temperature sensor, the plurality of secondary temperature sensors, or both, comprise a negative temperature coefficient thermistor.

14. The method of claim 1, determining the trigger comprises:
determining that the first skin temperature data, the second skin temperature data, or both, are associated with a first temperature range that is different from a second temperature range associated with a prior calibration of the plurality of secondary temperature sensors, wherein calibrating the plurality of secondary temperature sensors is based at least in part on determining that the first skin temperature data, the second skin temperature data, or both, are associated with the first temperature range that is different from the second temperature range associated with a prior calibration of the plurality of secondary temperature sensors.

15. A wearable ring device comprising:
one or more processors;
one or more memories coupled with the one or more processors;
a plurality of temperature sensors coupled with the one or more processors and the one or more memories, the plurality of temperature sensors comprising at least:
a primary temperature sensor located at a first radial position on or within an inner curved surface of the wearable ring device to collect skin temperature data from a first location of a tissue of a user; and
a plurality of secondary temperature sensors each located at a respective second radial position on or within an inner curved surface of the wearable ring device to collect skin temperature data from a respective second location of the tissue of the user; and
instructions stored in the one or more memories and executable by the one or more processors to cause the wearable ring device to:
determine a trigger to calibrate the plurality of secondary temperature sensors based at least in part on one or more conditions;
acquire first skin temperature data from the first location of the tissue of the user via the primary temperature sensor, and second skin temperature data from each respective second location of the tissue of the user via the plurality of secondary temperature sensors, based at least in part on the trigger;
calibrate, in response to the trigger, the plurality of secondary temperature sensors using the primary temperature sensor, the first skin temperature data, and the second skin temperature data, wherein calibration of the plurality of secondary temperature sensors comprises adjusting a respective temperature measurement sampling interval of each secondary temperature sensor of the plurality of secondary temperature sensors;
acquire additional skin temperature data from the user via at least the plurality of secondary temperature sensors based at least in part on calibrating the plurality of secondary temperature sensors;

determine a plurality of sleep stages of the user based at least in part on the additional skin temperature data, the plurality of sleep stages comprising one or more of an awake sleep stage, a rapid eye movement sleep stage, a light sleep stage, and a deep sleep stage; and display, via a graphical user interface of a user device associated with the wearable ring device, an indication of the plurality of sleep stages of the user.

16. The wearable ring device of claim 15, wherein the inner curved surface of the wearable ring device is configured to contact a finger of the user when the wearable ring device is being worn by the user.

17. The wearable ring device of claim 15, wherein the instructions are further executable by the one or more processors to cause the wearable ring device to:

determine that the first skin temperature data, the second skin temperature data, or both, are associated with a first temperature range that is different from a second temperature range associated with a prior calibration of the plurality of secondary temperature sensors, wherein calibrating the plurality of secondary temperature sensors is based at least in part on determining that the first skin temperature data, the second skin temperature data, or both, are associated with the first temperature range that is different from the second temperature range associated with a prior calibration of the plurality of secondary temperature sensors.

18. A non-transitory computer-readable medium storing code for temperature calibration by a wearable device comprising at least a primary temperature sensor and a plurality of secondary temperature sensors, the code comprising instructions executable by one or more processors of the wearable device to:

determine a trigger to calibrate the plurality of secondary temperature sensors based at least in part on one or more conditions;

acquire first skin temperature data from a first location of a tissue of a user via the primary temperature sensor, and second skin temperature data from a respective second location of a tissue of the user via each secondary temperature sensor of the plurality of secondary temperature sensors, based at least in part on the trigger;

calibrate, in response to the trigger, the plurality of secondary temperature sensors using the primary temperature sensor, the first skin temperature data, and the second skin temperature data, wherein calibration of the plurality of secondary temperature sensors comprises adjusting a respective temperature measurement sampling interval of each secondary temperature sensor of the plurality of secondary temperature sensors;

acquire additional skin temperature data from the user via at least the plurality of secondary temperature sensors based at least in part on calibrating the plurality of secondary temperature sensors;

determine a plurality of sleep stages of the user based at least in part on the additional skin temperature data, the plurality of sleep stages comprising one or more of an awake sleep stage, a rapid eye movement sleep stage, a light sleep stage, and a deep sleep stage; and display, via a graphical user interface of a user device associated with the wearable device, an indication of the plurality of sleep stages of the user.

19. The non-transitory computer-readable medium of claim 18, wherein the instructions to determine the trigger are executable by the one or more processors to:

determine that the first skin temperature data, the second skin temperature data, or both, satisfies a threshold for a duration, wherein the instructions to calibrate the plurality of secondary temperature sensors using the primary temperature sensor are executable by the one or more processors based at least in part on that the first skin temperature data, the second skin temperature data, or both, satisfying the threshold for the duration.

* * * * *